United States Patent
Ujiie et al.

(10) Patent No.: US 11,636,201 B2
(45) Date of Patent: *Apr. 25, 2023

(54) METHOD OF UPDATING FRAUD DETECTION RULES FOR DETECTING MALICIOUS FRAMES, FRAUD DETECTING ELECTRONIC CONTROL UNIT, AND ON-BOARD NETWORK SYSTEM

(71) Applicant: PANASONIC INTELLECTUAL PROPERTY CORPORATION OF AMERICA, Torrance, CA (US)

(72) Inventors: Yoshihiro Ujiie, Osaka (JP); Hideki Matsushima, Tokyo (JP); Tomoyuki Haga, Nara (JP); Yuji Unagami, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/132,824

(22) Filed: Dec. 23, 2020

(65) Prior Publication Data

US 2021/0117537 A1    Apr. 22, 2021

Related U.S. Application Data

(63) Continuation of application No. 16/431,002, filed on Jun. 4, 2019, now Pat. No. 10,909,237, which is a
(Continued)

(30) Foreign Application Priority Data

Oct. 30, 2015  (JP) ................................. 2015-214740

(51) Int. Cl.
*G06F 21/55* (2013.01)
*B60R 16/02* (2006.01)
(Continued)

(52) U.S. Cl.
CPC ............ *G06F 21/552* (2013.01); *B60R 16/02* (2013.01); *B60R 16/023* (2013.01);
(Continued)

(58) Field of Classification Search
None
See application file for complete search history.

(56) References Cited

U.S. PATENT DOCUMENTS 8,311,858 B2 * 11/2012 Everett ................. G07C 5/008
340/576
2011/0083161 A1 4/2011 Ishida et al.
(Continued)

FOREIGN PATENT DOCUMENTS

EP  3142288 A1  3/2017
JP  2005-295306 A  10/2005
(Continued)

OTHER PUBLICATIONS

International Search Report of PCT Application No. PCT/JP2015/005719, dated Jan. 12, 2016.
(Continued)

*Primary Examiner* — Brandon Hoffman
(74) *Attorney, Agent, or Firm* — Greenblum & Bernstein, P.L.C.

(57) ABSTRACT

A method used in an on-board network system, having electronic controllers that exchange messages and a fraud detecting electronic controller. The method includes determining whether a message transmitted conforms to fraud detection rules, and querying an external device whether there is delivery data for updating the fraud detection rules. When there is the delivery data for updating the fraud detection rules, receiving from an external device the delivery data, including updated fraud detection rules and network type information indicating a network type that the
(Continued)

updated fraud detection rules are to be applied. The method also includes determining whether a vehicle in which the on-board network system is installed is running, and whether the network type information indicates a drive network that is connected to an electronic controller related to travel of the vehicle. When the network type information does not indicate the drive network, updating the fraud detection rules.

20 Claims, 34 Drawing Sheets

Related U.S. Application Data continuation of application No. 15/381,498, filed on Dec. 16, 2016, now Pat. No. 10,372,903, which is a continuation of application No. PCT/JP2015/005719, filed on Nov. 17, 2015.

(60) Provisional application No. 62/105,363, filed on Jan. 20, 2015.

(51) Int. Cl.
*B60R 16/023* (2006.01)
*H04L 12/28* (2006.01)
*H04L 9/40* (2022.01)
*G06F 13/36* (2006.01)

(52) U.S. Cl.
CPC .......... *B60R 16/0231* (2013.01); *G06F 13/36* (2013.01); *H04L 12/28* (2013.01); *H04L 63/20* (2013.01); *G06F 2221/034* (2013.01); *H04L 63/02* (2013.01)

(56) References Cited

U.S. PATENT DOCUMENTS

2015/0358329 A1 12/2015 Noda et al.
2016/0264071 A1 9/2016 Ujiie et al.

FOREIGN PATENT DOCUMENTS

| JP | 2007-038904 A | 2/2007 |
| JP | 2008-189125 A | 8/2008 |
| JP | 2013-151222 A | 8/2013 |
| JP | 2014-168219 A | 9/2014 |
| WO | 2009/147734 A1 | 12/2009 |
| WO | 2015/170452 A1 | 11/2015 |

OTHER PUBLICATIONS

Satoshi Otsuka et al., "Intrusion Detection for In-vehicle Networks without Modifying Legacy ECUs", IPSJ SIG Technical Report, 2013-EMB-28(6), pp. 1-5, Mar. 6, 2013.
The Extended European Search Report, dated Aug. 31, 2022, for the related European Patent Application No. 22173800.8.

* cited by examiner

FIG. 4

| ACCEPTED ID LIST |
|---|
| 1 |
| 2 |
| 3 |

FIG. 5

| ACCEPTED ID LIST |
|---|
| 1 |
| 2 |
| 3 |
| 4 |

FIG. 6

| ACCEPTED ID LIST |
|---|
| 1 |
| 2 |
| 3 |
| 4 |
| 5 |

FIG. 7

| ID | DATA |
|---|---|
| 1 | 0 |
| 1 | 1 |
| 1 | 2 |
| 1 | 3 |
| 1 | 4 |
| ... | ... |

FIG. 8

| ID | DATA |
|---|---|
| 2 | 100 |
| 2 | 90 |
| 2 | 80 |
| 2 | 70 |
| 2 | 60 |
| ... | ... |

FIG. 9

| ID | DATA |
|---|---|
| 3 | 1 |
| 3 | 1 |
| 3 | 0 |
| 3 | 0 |
| 3 | 0 |
| ... | ... |

FIG. 10

| ID | DATA |
|---|---|
| 4 | 0 |
| 4 | 10 |
| 4 | 20 |
| 4 | 30 |
| 4 | 40 |
| ... | ... |

FIG. 11

| ID | DATA |
|---|---|
| 5 | 0 |
| 5 | 0 |
| 5 | 1 |
| 5 | 1 |
| 5 | 1 |
| ... | ... |

FIG. 13

| FORWARDING SOURCE | FORWARDING DESTINATION | ID |
|---|---|---|
| 200a | 200b | * |
| 200b | 200a | 3 |
| 200b | 200c | * |
| 200c | 200b | – |

FIG. 15

| Ver. | ID |
|---|---|
| 1.0 | 1 |
|  | 2 |
|  | 3 |

FIG. 16

| Ver. | ID |
|---|---|
| 1.0 | 1 |
|  | 2 |
|  | 3 |
|  | 4 |

| Ver. | ID |
|---|---|
| 1.0 | 1 |
| | 2 |
| | 3 |
| | 4 |
| | 5 |

| TARGET CAR MODEL | FRAUD DETECTION RULE LIST | | |
|---|---|---|---|
| | BUS TYPE | FRAUD DETECTION RULE Ver. | FRAUD DETECTION RULE |
| CAR MODEL A | DRIVE | 2.0 | 1, 2, 3, 4 |
| | BODY | 1.0 | 1, 2, 3, 4 |
| | SAFETY | 1.0 | 1, 2, 3, 4, 5 |

FIG. 21

| TARGET CAR MODEL | VEHICLE No. | BUS TYPE | POST-UPDATE FRAUD DETECTION RULE Ver. |
|---|---|---|---|
| CAR MODEL A | 00000001 | DRIVE | 2.0 |

FIG. 23

| TARGET CAR MODEL | VEHICLE No. | BUS TYPE | LAST UPDATED FRAUD DETECTION RULE Ver. | LAST UPDATE TIME |
|---|---|---|---|---|
| A | 00000001 | DRIVE | 2.0 | 20X1/07/01 13:00 |
| A | 00000001 | BODY | 1.0 | 20X1/07/01 13:00 |
| A | 00000001 | SAFETY | 1.0 | 20X1/07/01 13:00 |

FIG. 32

| ACCEPTED ID LIST |
|---|
| 1 |
| 2 |
| 3 |
| 4 |
| 5 |
| 0x0F0 |
| 0x0F1 |
| 0x0F2 |

FIG. 33

| ID | FRAUD DETECTION RULE LIST | | |
|---|---|---|---|
| | FRAUD DETECTION RULE Ver. | NUMBER OF RULES | FRAUD DETECTION RULE |
| 0x0E0 | 20 | 04 | 01 02 03 04 |

FIG. 34

| ID | POST-UPDATE FRAUD DETECTION RULE Ver. |
|---|---|
| 0x0F0 | 20 |

FIG. 35

| FORWARDING SOURCE | FORWARDING DESTINATION | ID |
|---|---|---|
| 200a | 200b | * |
| 200a | 200d | * |
| 200b | 200a | 3 |
| 200b | 200d | * |
| 200d | 200a | 0x0E0 |
| 200d | 200b | 0x0E1, 0x0E2 |

FIG. 37

| Ver. | ID |
|---|---|
| 1.0 | 1 |
|  | 2 |
|  | 3 |
|  | 0x0E0 |

FIG. 38

| Ver. | ID |
|---|---|
| 1.0 | 1 |
|  | 2 |
|  | 3 |
|  | 4 |
|  | 0x0E1 |
|  | 0x0E2 |
|  | 0x0F1 |
|  | 0x0F2 |

FIG. 39

| Ver. | ID |
|---|---|
| 1.0 | 1 |
| | 2 |
| | 3 |
| | 4 |
| | 5 |
| | 0x0E2 |
| | 0x0F2 |

FIG. 41

| BUS TYPE | LAST UPDATED FRAUD DETECTION RULE Ver. |
|---|---|
| DRIVE | 2.0 |
| BODY | 1.0 |
| SAFETY | 1.0 |

METHOD OF UPDATING FRAUD DETECTION RULES FOR DETECTING MALICIOUS FRAMES, FRAUD DETECTING ELECTRONIC CONTROL UNIT, AND ON-BOARD NETWORK SYSTEM

CROSS REFERENCE TO RELATED APPLICATIONS

This is a continuation of U.S. patent application Ser. No. 16/431,002, filed Jun. 4, 2019, and now U.S. Patent No. 10,909, 237 issued Feb. 2, 2021, which is a continuation of U.S. patent application Ser. No. 15/381,498, filed Dec. 16, 2016, and now U.S. Pat. No. 10,372,903 issued Aug. 6, 2019, which is a continuation of International Patent Application No. PCT/JP2015/005719, filed Nov. 17, 2015, which claims the benefit of U.S. Provisional Patent Application No. 62/105,363, filed Jan. 20, 2015, and claims the benefit of Japanese Patent Application No. 2015-214740, filed Oct. 30, 2015. The entire disclosure of each of the above-identified documents, including the specification, drawings, and claims, is incorporated herein by reference in its entirety.

BACKGROUND

1. Technical Field

The present disclosure discloses a technology for updating fraud detection rules used to detect malicious frames transmitted in an on-board network on which electronic control units communicate.

2. Description of the Related Art

Recently, in systems inside automobiles, devices called electronic control units (ECUs) are being disposed in large numbers. A network joining these ECUs is called an on-board network. Various standards exist for on-board networks. One of the most prevalent on-board network standards is called a controller area network (CAN) prescribed in ISO 11898-1.

In a CAN, communication links (buses) we formed using two cables, and an ECU connected to the buses is called a node. Each node connected to the buses transmits and receives messages called frames. A transmitting node that transmits a frame applies a voltage to the two cables, and by producing a potential difference between the cables, transmits a value of "1", called recessive, and a value of "0", called dominant. When multiple transmitting nodes transmit recessive and dominant at the exact same timing, the dominant is prioritized for transmission. When there is an abnormality in the format of a received frame, the receiving node transmits a frame called an error frame. In an error frame, dominant is transmitted for 6 bits in succession, thereby notifying the transmitting node and other receiving nodes of the abnormality in the frame.

In addition, in a CAN, identifiers that indicate the destination and the source of a transmission do not exist, and instead, the transmitting node transmits (in other words, sends out signals on the buses) while attaching an ID called a message ID to each frame, while each receiving node receives (in other words, reads signals from the buses) only a predetermined message ID. Also, carrier sense multiple access with collision avoidance (CSMA/CA) is adopted, whereby mediation according to message ID is conducted when multiple nodes transmit simultaneously, and the frame whose message ID has the smaller value is prioritized for transmission.

In the related art, there is known a technology in which, when an abnormal message is transmitted on a CAN bus, a gateway device that connects between the buses detects the abnormal message and does not forward the abnormal message to the other bus, thereby moderating increases in the bus load (see Japanese Unexamined Patent Application Publication No. 2007-38904). Also known is a technology that checks the period of a message transmitted periodically, and determines a malicious frame (see Satoshi Otsuka and Tasuku Ishigooka, "Intrusion Detection for In-vehicle Networks without Modifying Legacy ECUs", Special Interest Group on Embedded Systems (EMB), Information Processing Society of Japan, 2013-EMB-28(6), 1-5, Mar. 6, 2013).

SUMMARY

Meanwhile, as the functions of ECUs constituting an on-board network system are modified (such as upgraded), for example, there may occur a need to update the rules that serve as the basis of determination for determining that a message (frame) is malicious (abnormal). Also, if the rules are fixed, there is an increased risk that a malicious ECU may be connected to the on-board network and transmit a message bypassing those rules, for example, and thus modifying (updating) the rules may be useful.

One non-limiting and exemplary embodiment provides a fraud detection rule updating method enabling the updating of rules that serve as the basis for detecting malicious frames as necessary in an on-board network system. Also provided is an on-board network system enabling the updating of such rules, as well as a fraud detecting electronic control unit (fraud detecting ECU) that detects malicious frames in such an on-board network system.

In one general aspect, the techniques disclosed here feature a method used in an on-board network system provided with a plurality of electronic control units (ECUs) that exchange messages by communication over one or a plurality of a bus, and a fraud detecting electronic control unit (ECU) connected to the bus, the method comprising: In the fraud detecting electronic control unit, determining, based on fraud detection rules, whether or not a message transmitted on the bus connected to the fraud detecting electronic control unit conforms to the rules; receiving, from an external device external to the on-board network system, delivery data including updated fraud detection rules and bus type information Indicating a type of bus to which the updated fraud detection rules are to be applied; determining whether or not a vehicle in which the on-board network system is Installed Is running; If the vehicle is determined to be running, additionally determining whether or not the bus type information Indicates a drive bus related to running; (i) if the bus type information indicates a drive bus related to running, not conducting an update process with the updated fraud detection rules; and (ii) If the bus type information does not indicate a drive bus related to running, updating the fraud detection rules to the updated fraud detection rules.

According to the present disclosure, it becomes possible to update the rules that serve as the basis for determining that a malicious frame was transmitted on an on-board network, and thus the function of detecting malicious frames may be updated. Consequently, it becomes possible to accommodate modifications and other changes to the on-board network system, and in addition, it becomes possible to decrease the risk of a malicious ECU bypassing the rules to transmit a message on an on-board network.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of an accepted ID list stored by an ECU according to Embodiment 1;

FIG. 5 is a diagram illustrating an example of an accepted ID list stored by an ECU according to Embodiment 1;

FIG. 6 is a diagram illustrating an example of an accepted ID list stored by an ECU according to Embodiment 1;

FIG. 7 is a diagram illustrating an example of message IDs and data in frames transmitted from an ECU connected to an engine;

FIG. 8 is a diagram illustrating an example of message IDs and data in frames transmitted from an ECU connected to a brake;

FIG. 9 is a diagram illustrating an example of message IDs and data in frames transmitted from an ECU connected to a door open/close sensor;

FIG. 10 is a diagram illustrating an example of message IDs and data in frames transmitted from an ECU connected to a window open/close sensor;

FIG. 11 is a diagram illustrating an example of message IDs and data in frames transmitted from an ECU connected to a corner sensor;

FIG. 13 is a diagram illustrating an example of forwarding rules stored by a gateway according to Embodiment 1;

FIG. 15 is a diagram illustrating an example of fraud detection rules and version information stored by a fraud detecting ECU according to Embodiment 1;

FIG. 16 is a diagram illustrating an example of fraud detection rules and version information stored by a fraud detecting ECU according to Embodiment 1;

FIG. 21 is a diagram illustrating an example of update result data according to Embodiment 1;

FIG. 23 is a diagram illustrating an example of an update result table according to Embodiment 1;

FIG. 32 is a diagram illustrating an example of an accepted ID list stored by a head unit according to Embodiment 2;

FIG. 33 is a diagram illustrating an example of internal delivery data according to Embodiment 2;

FIG. 34 is a diagram illustrating an example of internal update result data according to Embodiment 2;

FIG. 35 is a diagram illustrating an example of forwarding rules stored by a gateway according to Embodiment 2;

FIG. 37 is a diagram illustrating an example of fraud detection rules and version information stored by a fraud detecting ECU according to Embodiment 2;

FIG. 38 is a diagram lustrating an example of fraud detection rules and version information stored by a fraud detecting ECU according to Embodiment 2;

FIG. 39 is a diagram illustrating an example of fraud detection rules and version information stored by a fraud detecting ECU according to Embodiment 2;

FIG. 41 is a diagram illustrating an example of an internal update result table according to Embodiment 2;

DETAILED DESCRIPTION

Figure 1:
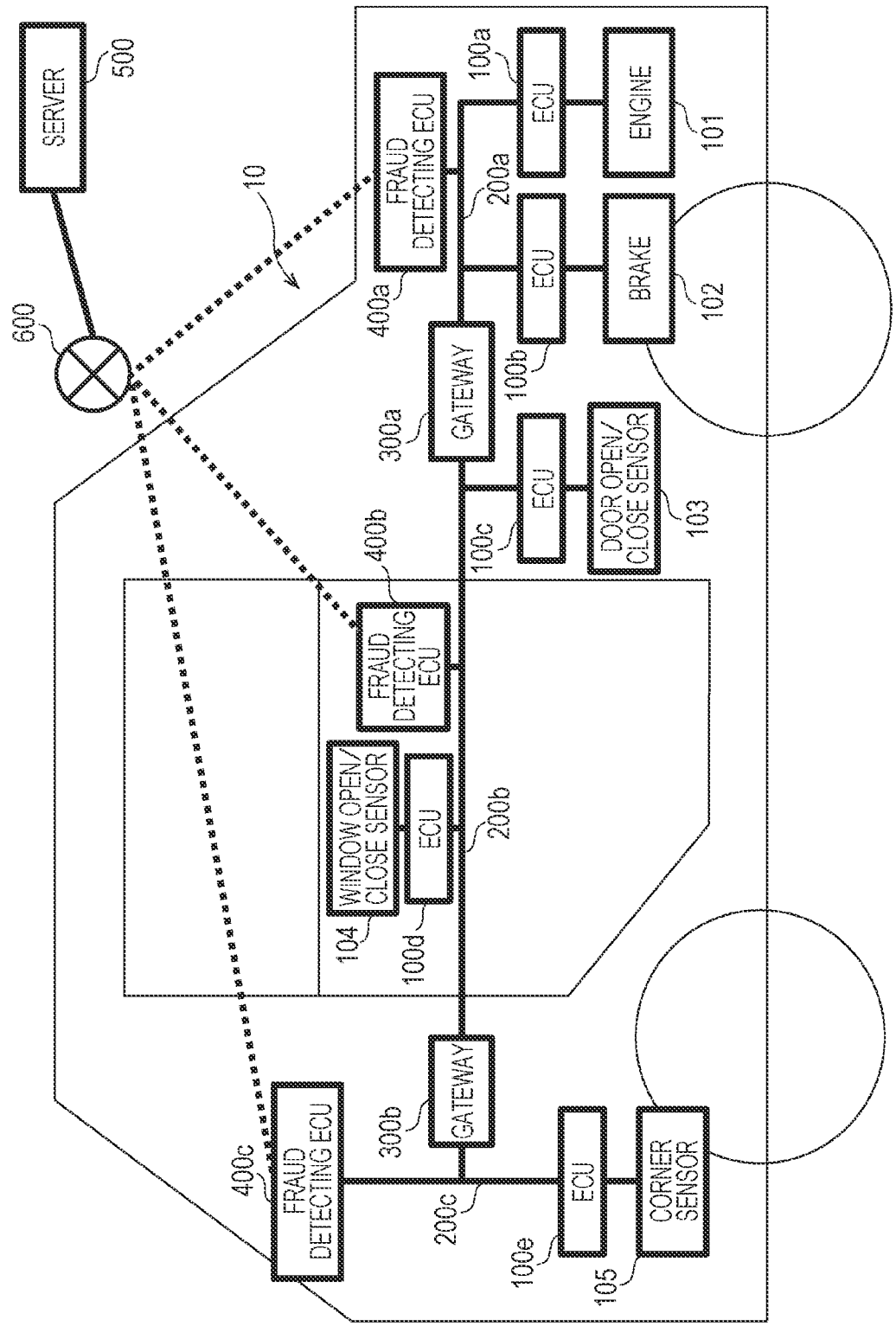
FIG. 1 is a diagram illustrating an overall configuration of an on-board network system according to Embodiment 1.

A method according to an aspect of the present disclosure is a method used in an on-board network system provided with a plurality of electronic control units (ECUs) that exchange messages by communication over one or a plurality of a bus, and a fraud detecting electronic control unit (ECU) connected to the bus, the method comprising: in the fraud detecting electronic control unit, determining, based on fraud detection rules, whether or not a message transmitted on the bus connected to the fraud detecting electronic control unit conforms to the rules; receiving, from an external device external to the on-board network system, delivery data including updated fraud detection rules and bus type information indicating a type of bus to which the updated fraud detection rules are to be applied; determining whether or not a vehicle in which the on-board network system is installed is running; If the vehicle is determined to be running, additionally determining whether or not the bus type information indicates a drive bus related to running; (i) If the bus type information indicates a drive bus related to running, not conducting an update process with the updated fraud detection rules; and (ii) if the bus type information does not indicate a drive bus related to running, updating the fraud detection rules to the updated fraud detection rules. Consequently, it becomes possible to update the rules that serve as the basis for determining that a malicious frame was transmitted on an on-board network. Consequently, it becomes possible to accommodate modifications and other changes to the on-board network system, and in addition, it becomes possible to decrease the risk of a malicious ECU bypassing the rules to transmit a message on an on-board network.

The above aspect may also be configured so that the delivery data includes bus type information indicating a type of bus to which the updated fraud detection rules are to be applied, and if the type of the bus connected to the fraud detecting electronic control unit is indicated by the bus type information, the fraud detecting electronic control unit treats the certain update condition as satisfied, and conducts the update. Thus, it is possible to accommodate different fraud detection rules needed for each type of bus.

The above aspect may also be configured so that the delivery data includes a plurality of updated fraud detection rules, and includes bus type information indicating a type of bus corresponding to each of the plurality of updated fraud detection rules, and the fraud detecting electronic control unit conducts the receiving of the delivery data by communicating with the external device, extracts from the delivery data updated fraud detection rules corresponding to bus type information matching the type of the bus connected to the fraud detecting electronic control unit, and updates the fraud detection rules associated with the determination to the extracted updated fraud detection rules. Thus, on the side of the external device that delivers the fraud detection rules, batch delivery becomes possible, and the processing load is reduced.

The above aspect may also be configured so that the delivery data includes a plurality of updated fraud detection rules, and includes bus type information Indicating a type of bus corresponding to each of the plurality of updated fraud detection rules, one of the electronic control units conducts the receiving of the delivery data, includes each of the updated fraud detection rules from the delivery data in a message with an attached message ID for updating fraud detection rules according to the type of bus indicated by the corresponding bus type information, and transmits the message over the bus, and the fraud detecting electronic control unit receives from the bus the message with the message ID for updating fraud detection rules according to the type of the bus connected to the fraud detecting electronic control unit, and updates the fraud detection rules associated with the determination to the updated fraud detection rules included in the message. Thus, the processing load on the individual fraud detecting ECUs in order for just one ECU to communicate externally may be reduced. Also, according to this configuration, from an implementation perspective, such as the cryptographic processes that ensure security for communicated content, even if a computationally intensive cryptographic scheme is used in the ECU that communicates with the outside, for example, a less computationally intensive cryptographic scheme may be selected for each fraud detecting ECU that does not communicate with the outside. Additionally, the number of communications between the server and the on-board network system may be decreased compared to the case in which the individual fraud detecting ECUs communicate.

The above aspect may also be configured so that the delivery data includes associated information, the certain update condition is a condition related to the associated information, and the updating of the fraud detection rules is conducted if the associated information in the received delivery data satisfies the certain update condition, and is not conducted if the associated information does not satisfy the certain update condition. Thus, it becomes possible to determine whether or not an update is needed, based on information related to the updated fraud detection rules.

The above aspect may also be configured so that whether or not the certain update condition is satisfied is determined according to a result of comparing the associated information to information stored by the electronic control unit or the fraud detecting electronic control unit. Thus, it becomes possible to make a comparative judgment, such as whether the version of the updated fraud detection rules is newer than the version of the existing fraud detection rules.

The above aspect may also be configured so that the associated information indicates a version of the updated fraud detection rules, and if the associated information indicates a version newer than the version of the fraud detection rules serving as a basis of the determination, the fraud detecting electronic control unit treats the certain update condition as satisfied, and conducts the update. Thus, it becomes possible to manage changes in the content of the fraud detection rules according to version.

The above aspect may also be configured so that the associated information Indicates a vehicle type to which the updated fraud detection rules are to be applied, and if the associated information indicates a vehicle type corresponding to a vehicle in which the on-board network system is installed, the certain update condition is treated as satisfied, and the update is conducted. Thus, it becomes possible to prescribe fraud detection rules independently for individual car models.

The above aspect may also be configured so that the certain update condition is a condition that a status of a vehicle in which the on-board network system is installed is a certain status. Thus, by deciding a status with comparatively high safety as the certain status, for example, it becomes possible to update the fraud detection rules safely.

The above aspect may also be configured so that if the status of the vehicle is not the certain status when the delivery data is received, when the status of the vehicle changes to the certain status, the fraud detection rules associated with the determination are updated to the updated fraud detection rules included in the already-received delivery data, or alternatively, the delivery data is newly received from the external device and the fraud detection rules are updated to the updated fraud detection rules included in the newly received delivery data. Thus, the updating of the fraud detection rules may be conducted appropriately when the status of the vehicle changes to the certain status.

The above aspect may also be configured so that the fraud detection rules and the updated fraud detection rules are configured to include a program for determining conformity to the rules. Thus, it becomes possible to update the program for fraud detection.

The above aspect may also be configured so that the delivery data has subjected to a cryptographic process, and during the receiving of the delivery data, a process corresponding to the cryptographic process is performed. Thus, the security of the fraud detection rules may be ensured.

The above aspect may also be configured so that the plurality of electronic control units communicate over the bus in accordance with a controller area network (CAN) protocol. Thus, it becomes possible to update the fraud detection rules in an on-board network system following CAN.

Also, a fraud detecting electronic control unit according to an aspect of the present disclosure is a fraud detecting electronic control unit (ECU) connected to a bus used for communication by a plurality of electronic control units, comprising: a processor and a memory having a computer program stored thereon, the computer program causing the processor to execute operations including: storing fraud detection rules; determining, based on the fraud detection rules, whether or not a message transmitted on the bus connected to the unit itself conforms to the rules; receiving delivery data including updated fraud detection rules and bus type information Indicating a type of bus to which the updated fraud detection rules are to be applied; determining whether or not a vehicle in which the on-board network system is installed is running; If the vehicle is determined to be running, additionally determining whether or not the bus type information Indicates a drive bus related to running; (i) If the bus type information Indicates a drive bus related to running, not conducting an update process with the updated fraud detection rules; and (II) If the bus type information does not indicate a drive bus related to running, updating the fraud detection rules to the updated fraud detection rules. Thus, it becomes possible to update the rules that serve as the basis for determining that a malicious frame was transmitted.

Also, an on-board network system according to an aspect of the present disclosure is an on-board network system provided with a plurality of electronic control units (ECUs) that exchange messages by communication over one or a plurality of a bus, and a fraud detecting electronic control unit (ECU) connected to the bus, wherein the fraud detecting electronic control unit determines, based on fraud detection rules, whether or not a message transmitted on the bus connected to the fraud detecting electronic control unit conforms to the rules, the electronic control units receive, from an external device external to the on-board network system, delivery data including updated fraud detection rules and bus type information Indicating a type of bus to which the updated fraud detection rules are to be applied, and transmit the updated fraud detection rules over the bus, and the fraud detecting electronic control unit receives the updated fraud detection rules from the bus, determines whether or not a vehicle in which the on-board network system is installed is running, if the vehicle is determined to be running, additionally determines whether or not the bus type information indicates a drive bus related to running, (i) if the bus type information indicates a drive bus related to running, does not conduct an update process with the updated fraud detection rules, and (ii) If the bus type information does not indicate a drive bus related to running, updates the fraud detection rules to the updated fraud detection rules. Thus, since updating the fraud detection rules becomes possible, it becomes possible to accommodate modifications and other changes to the configuration of the on-board network system, and in addition, it becomes possible to decrease the risk of a malicious ECU bypassing the rules to transmit a message on the on-board network.

Note that these general or specific aspects may also be realized by a system, method, integrated circuit, computer program, or computer-readable recording medium such as a CD-ROM disc, and may also be realized by an arbitrary combination of a system, method, integrated circuit, computer program, and recording medium.

Hereinafter, an on-board network system using a fraud detection rule updating method according to an embodiment will be described with reference to the drawings. Each of the embodiments indicated herein illustrates a specific example of the present disclosure. Consequently, features such as numerical values, structural elements, layout positions and connection states of structural elements, as well as steps and the ordering of steps indicated in the following embodiments are merely examples, and are not intended to limit an aspect of the present disclosure. Among the structural elements in the following embodiments, structural elements that are not described in the independent claims are arbitrary or optional structural elements. Also, the drawings are diagrammatic views, and are not necessarily drawn strictly.

Embodiment 1

Hereinafter, the drawings will be used to describe, as an embodiment of the present disclosure, a fraud detection rule updating method that updates fraud detection rules used by a fraud detecting ECU to detect malicious frames (messages) transmitted on a bus in an on-board network system 10 installed on-board a vehicle in which multiple ECUs communicate via a bus. The fraud detecting ECU conducts an inspection based on the fraud detection rules (in other words, a determination of conformity to the rules) for a frame transmitted on a bus used for communication between the ECUs constituting the on-board network system 10. By a process utilizing the result of the inspection (that is, the fraud detection) by the fraud detecting ECU, it becomes possible to prevent the vehicle from being controlled inappropriately due to a situation such as a malicious ECU being connected to the bus and transmitting a malicious frame that does not conform to the rules, for example. In the present embodiment, an example is given in which the fraud detection function is updated (in other words, the basis for determining that a frame is malicious, or the fraud detection rules that serve as such a basis, are updated) by having each fraud detecting ECU connected to each bus communicate with a server external to the vehicle.

1.1 Overall Configuration of On-Board Network System 10

FIG. 1 is a diagram illustrating an overall configuration of the on-board network system 10. The on-board network system 10 is an example of a network communication system that communicates in accordance with the CAN protocol, and is a network communication system in an automobile having various types of equipment, such as control devices and sensors, installed on-board. The on-board network system 10 is configured to include buses 200a to 200c and respective nodes connected to the buses, such as fraud detecting ECUs 400a to 400c, gateways 300a and 300b, and ECUs such as ECUs 100a to 100e connected to various types of equipment. In addition, FIG. 1 also illustrates an external network 600 that wirelessly communicates with the fraud detecting ECUs 400a to 400c in the on-board network system 10, and a server 500 communicably connected to the network 600. Note that, although omitted from FIG. 1, the on-board network system 10 may include a number of ECUs other than the ECUs 100a to 100e. In the on-board network system 10, respective ECUs exchange frames in accordance with the CAN protocol. An ECU is a device that includes components such as a processor (microprocessor), digital circuits such as memory, analog circuits, and communication circuits. The memory is memory such as ROM and RAM, and is able to store a control program (computer program) executed by the processor. For example, by having the processor operate by following the control program (computer program), the ECU realizes various functions. Note that the computer program herein is made up of a plural combination of instruction codes indicating commands to the processor in order to achieve a designated function. There is a possibilty that a malicious ECU which transmits a malicious message may be connected to the buses 200a to 200c, and thus if a malicious frame that does not conform to the rules appears on a bus, the fraud detecting ECUs 400a to 400c detect the malicious frame based on fraud detection rules.

Each of the fraud detecting ECUs 400a, 400b, and 400c is a type of ECU connected to the bus 200a, the bus 200b, and the bus 200c, respectively, and monitors frames appearing on the bus to which the ECU itself is connected. Each of the fraud detecting ECUs 400a to 400c includes a function of transmitting an error frame in the case of detecting a malicious frame.

Each of the ECUs 100a to 100e is connected to one of the buses, and is connected to an engine 101, a brake 102, a door open/close sensor 103, a window open/close sensor 104, and a corner sensor 105, respectively. Each of the ECUs 100a to 100e acquires the state of the connected equipment (such as the engine 101), and periodically transmits information such as a frame expressing the state (a data frame discussed later) on the network (that is, the bus).

The gateway 300a connects the bus 200a joining the fraud detecting ECU 400a, the ECU 100a, and the ECU 100b to the bus 200b joining the fraud detecting ECU 400b, the ECU 100c, and the ECU 100d. The gateway 300b connects the bus 200b joining the fraud detecting ECU 400b, the ECU 100c, and the ECU 100d to the bus 200c joining the fraud detecting ECU 400c and the ECU 100e. The gateways 300a and 300b include a function of forwarding a frame received from one bus to another bus. Whether or not to forward a received frame may also be toggled for each bus-to-bus connection. The gateways 300a and 300b are also a type of ECU.

The server 500 includes a function of transmitting delivery data for updating the fraud detection function of the fraud detecting ECUs 400a to 400c.

The communication method between the server 500 and the fraud detecting ECUs 400a to 400c may use any method. For example, besides wireless communication, wired communication may also be used. For wireless communication, a protocol such as WiFi (registered trademark), or a 3rd Generation (3G) or 4G (Long Term Evolution (LTE)) link used in applications like mobile phone networks may be used.

1.2 Data Frame Format

Hereinafter, a data frame, which is one of the frames used on a network following the CAN protocol, will be described.

Figure 2:
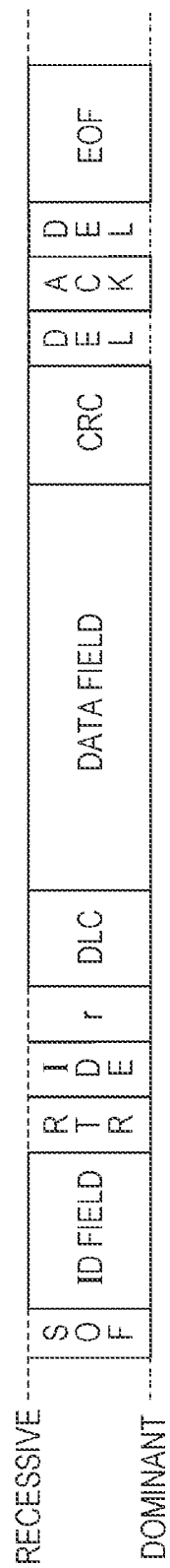
FIG. 2 is a diagram illustrating the data frame format prescribed by the CAN protocol.

FIG. 2 is a diagram illustrating the data frame format prescribed by the CAN protocol. FIG. 2 illustrates a data frame in the standard ID format prescribed by the CAN protocol. A data frame is made up of the following fields: Start of Frame (SOF), ID field, Remote Transmission Request (RTR), Identifier Extension (IDE), reserved bit "r", Data Length Code (DLC), data field, cyclic redundancy check (CRC) sequence, CRC delimiter "DEL", Acknowledgement (ACK) slot, ACK delimiter "DEL", and End of Frame (EOF).

The SOF is made up of one bit in the dominant state. The idle state of a bus is recessive, and changing to dominant with the SOF indicates the start of the transmission of a frame.

The ID field is an 11-bit field storing an ID (message ID), which is a value indicating the type of data. When multiple nodes start transmission at the same time, to conduct communication mediation with the ID field, the frame having the ID with the smaller value is designed to take higher priority.

The RTR is a value for distinguishing between a data frame and a remote frame, and is made up of one dominant bit in a data frame.

The IDE and "r" are both made up of one dominant bit.

The DLC is made up of 4 bits, and is a value indicating the length of the data field. Note that the IDE, r, and the DLC are collectively designated the control field.

The data field is made up of a maximum of 64 bits, and is a value indicating the content of the data to be transmitted. The length is adjustable in units of 8 bits. The format of the data to be sent is not prescribed by the CAN protocol, and is decided by the on-board network system 10. Consequently, the data format depends on factors such as the model of the car and the manufacturer.

The CRC sequence is made up of 15 bits, and is computed according to the transmitted values of the SOF, the ID field, the control field, and the data field.

The CRC delimiter is made up of one recessive bit, and is a delimiter indicating the end of the CRC sequence. Note that the CRC sequence and the CRC delimiter are collectively designated the CRC field.

The ACK slot is made up of one bit. The transmitting node sets the ACK slot to recessive for transmission. If the receiving node is able to receive up through the CRC sequence correctly, the receiving node transmits the ACK slot as dominant. Since dominant is prioritized over recessive, if the ACK slot is dominant after transmission, the transmitting node is able to confirm that one of the receiving nodes received data successfully.

The ACK delimiter is made up of one recessive bit, and is a delimiter indicating the end of the ACK.

The EOF is made up of seven recessive bits, and indicates the end of the data frame.

1.3 Configuration of ECU 100a

Figure 3:
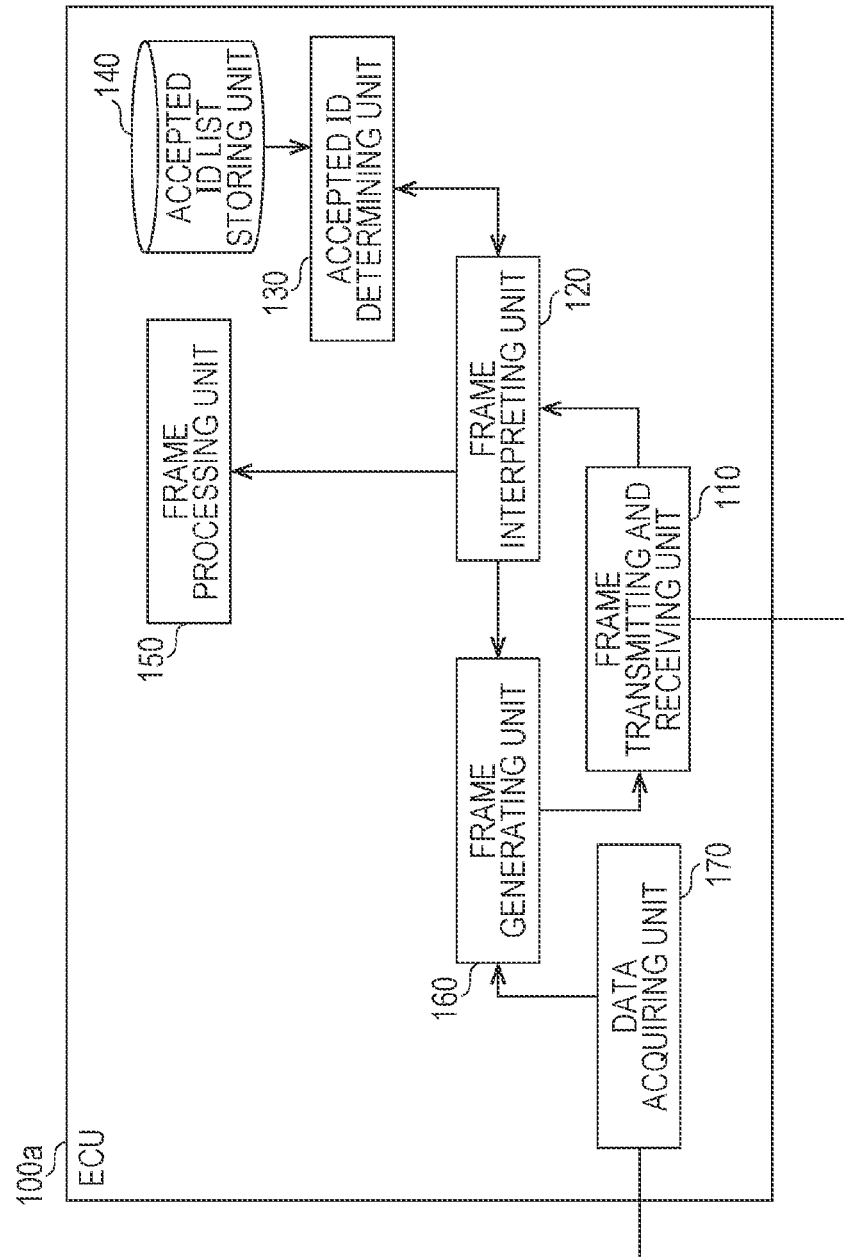
FIG. 3 is a configuration diagram of an ECU according to Embodiment 1.

FIG. 3 is a configuration diagram of the ECU 100a. The ECU 100a is configured to include a frame transmitting and receiving unit 110, a frame interpreting unit 120, an accepted ID determining unit 130, an accepted ID list storing unit 140, a frame processing unit 150, a frame generating unit 160, and a data acquiring unit 170. These respective structural elements are functional structural elements, and the respective functions are realized by components in the ECU 100a, such as a communication circuit, a processor that executes a control program stored in memory, or a digital circuit.

The frame transmitting and receiving unit 110 transmits and receives frames in accordance with the CAN protocol to and from the bus 200a. The frame transmitting and receiving unit 110 receives a frame one bit at a time from the bus 200a, and forwards the received frame to the frame interpreting unit 120. Additionally, the frame transmitting and receiving unit 110 transmits the content of a frame reported by the frame generating unit 160 to the bus 200a.

The frame interpreting unit 120 receives the values of a frame from the frame transmitting and receiving unit 110, and conducts interpretation to map the values to each field in the frame format prescribed by the CAN protocol. The value determined to be the ID field is forwarded to the accepted ID determining unit 130. Depending on a determination result reported by the accepted ID determining unit 130, the frame interpreting unit 120 decides whether to forward the value of the ID field and the data field appearing after the ID field to the frame processing unit 150, or stop the reception of the frame after receiving the determination result (in other words, stop interpretation for that frame). In addition, in the case of determining that the frame does not adhere to the CAN protocol, the frame interpreting unit 120 notifies the frame generating unit 160 to transmit an error frame. Also, if an error frame is received, or in other words, if a received frame is interpreted to be an error frame from a value in the frame, the frame interpreting unit 120 discards the rest of the frame, or in other words, stops interpretation of the frame.

The accepted ID determining unit 130 receives the value of the ID field reported by the frame interpreting unit 120, and follows a message ID list stored by the accepted ID list storing unit 140 to determine whether or not to receive each field in the frame following the ID field. The accepted ID determining unit 130 reports the determination result to the frame interpreting unit 120.

The accepted ID list storing unit 140 stores an accepted ID list, which is a list of IDs (message IDs) that the ECU 100a is to receive. FIG. 4 illustrates an example of an accepted ID list.

The frame processing unit 150 conducts a process related to a different function for each ECU according to the data of the received frame. For example, the ECU 100a connected to the engine 101 is equipped with a function of emitting an alarm sound if the door is open while in a state in which the speed exceeds 30 km. The ECU 100a includes a device such as a speaker for emitting the alarm sound, for example. Additionally, the frame processing unit 150 of the ECU 100a manages data received from other ECUs (for example, information indicating the state of a door), and conducts a process such as emitting an alarm sound under a certain condition based on the speed acquired from the engine 101.

The data acquiring unit 170 acquires data indicating the states of components such as equipment and sensors connected to the ECU, and notifies the frame generating unit 160.

The frame generating unit 160 constructs an error frame in accordance with a notification of instructions to transmit an error frame from the frame interpreting unit 120, and passes the error frame to the frame transmitting and receiving unit 110 for transmission. Additionally, the frame generating unit 160 constructs a frame by attaching a predetermined message ID to the value of the data reported by the data acquiring unit 170, and passes the constructed frame to the frame transmitting and receiving unit 110.

Note that the ECUs 100b to 100e likewise are equipped with a configuration basically similar to the ECU 100a discussed above. The content of the accepted ID list stored in the accepted ID list storing unit 140 may be different for each ECU, or the content may be the same. Also, the content of the process by the frame processing unit 150 is different for each ECU. For example, the content of the process by the frame processing unit 150 in the ECU 100c includes a process related to a function of emitting an alarm sound if a door is opened in a situation in which the brake is not applied. For example, the frame processing unit 150 in the ECU 100b, the ECU 100d, and the ECU 100e does not conduct any particular process. Note that each ECU may also be equipped with functions other than those given as an example herein. Note that the contents of frames transmitted by each of the ECUs 100a to 100e will be described later using FIGS. 7 to 11.

1.4 Accepted ID List Example 1

FIG. 4 is a diagram illustrating an example of an accepted ID list stored in each of the ECU 100a and the ECU 100b. The accepted ID list illustrated as an example in FIG. 4 is used to selectively receive and process frames including a message ID whose ID (message ID) value is any of "1", "2", and "3".

1.5 Accepted ID List Example 2

FIG. 5 is a diagram illustrating an example of an accepted ID list stored in each of the ECU 100c and the ECU 100d. The accepted ID list illustrated as an example in FIG. 5 is used to selectively receive and process frames including a message ID whose ID (message ID) value is any of "1", "2", "3", and "4".

1.6 Accepted ID List Example 3

FIG. 6 is a diagram illustrating an example of an accepted ID list stored in each of the ECU 100e, the gateway 300a, and the gateway 300b. The accepted ID list illustrated as an example in FIG. 6 is used to selectively receive and process frames including a message ID whose ID (message ID) value is any of "1", "2", "3", "4", and "5".

1.7 Example of Transmission Frames from ECU 100a Related to Engine

FIG. 7 is a diagram illustrating an example of an ID (message ID) and a data field (data) In frames transmitted from the ECU 100a connected to the engine 101. The message ID of frames transmitted by the ECU 100a is "1". The data expresses the speed (km/h), takes a value over a range from a minimum of 0 (km/h) to a maximum of 180 (km/h), with a data length of 1 byte. From the top row to the bottom row of FIG. 7, each message ID and data corresponding to each frame transmitted successively from the ECU 100a is illustrated as an example, expressing a situation of accelerating from 0 km/h in units of 1 km/h.

1.8 Example of Transmission Frames from ECU 100b Related to Brake

FIG. 8 is a diagram illustrating an example of an ID (message ID) and a data field (data) In frames transmitted from the ECU 100b connected to the brake 102. The message ID of frames transmitted by the ECU 100b is "2". The data expresses the degree of brake application as a percentage (%), with a data length of 1 byte. This percentage treats 0(%) as the state in which the brake is not being applied at all, and 100(%) as the state in which the brake is being applied to the fullest extent. From the top row to the bottom row of FIG. 8, each message ID and data corresponding to each frame transmitted successively from the ECU 100b is illustrated as an example, expressing a situation of gradually easing up on the brake from 100%.

1.9 Example of Transmission Frames from ECU 100c Related to Door Open/Dose Sensor FIG. 9 is a diagram illustrating an example of an ID (message ID) and a data field (data) In frames transmitted from the ECU 100c connected to the door open/close sensor 103. The message ID of frames transmitted by the ECU 100c is "3". The data expresses the open or closed state of a door, with a data length of 1 byte. A data value of "1" Indicates the door in the open state, while "0" Indicates the door in the closed state. From the top row to the bottom row of FIG. 9, each message ID and data corresponding to each frame transmitted successively from the ECU 100c is illustrated as an example, expressing a situation of the door progressively transitioning from the open state to the closed state.

1.10 Example of Transmission Frames from ECU 100d Related to Window Open/Dose Sensor FIG. 10 is a diagram illustrating an example of an ID (message ID) and a data field (data) in frames transmitted from the ECU 100d connected to the window open/close sensor 104. The message ID of frames transmitted by the ECU 100d s "4". The data expresses the open or closed state of a window as a percentage (%), with a data length of 1 byte. This percentage treats 0(%) as the state in which the window is fully closed, and 100(%) as the state in which the window is fully open. From the top row to the bottom row of FIG. 10, each message ID and data corresponding to each frame transmitted successively from the ECU 100d is illustrated as an example, expressing a situation of the window gradually opening from the closed state.

1.11 Example of Transmission Frames from ECU 100e Related to Corner Sensor

FIG. 11 is a diagram illustrating an example of an ID (message ID) and a data field (data) In frames transmitted from the ECU 100e connected to the corner sensor 105. The message ID of frames transmitted by the ECU 100e is 5S. The data length is 1 byte. The data value is "1" If the corner sensor 105 detects the presence of an obstacle in a fixed distance range from a corner of the vehicle, and "0" If an obstacle is not detected. From the top row to the bottom row of FIG. 11, each message ID and data corresponding to each frame transmitted periodically from the ECU 100e is illustrated as an example, expressing a situation of progressively transitioning from a state in which an obstacle to a corner of the vehicle is not detected to a state in which an obstacle is detected.

1.12 Configuration of Gateway 300a

Figure 12:
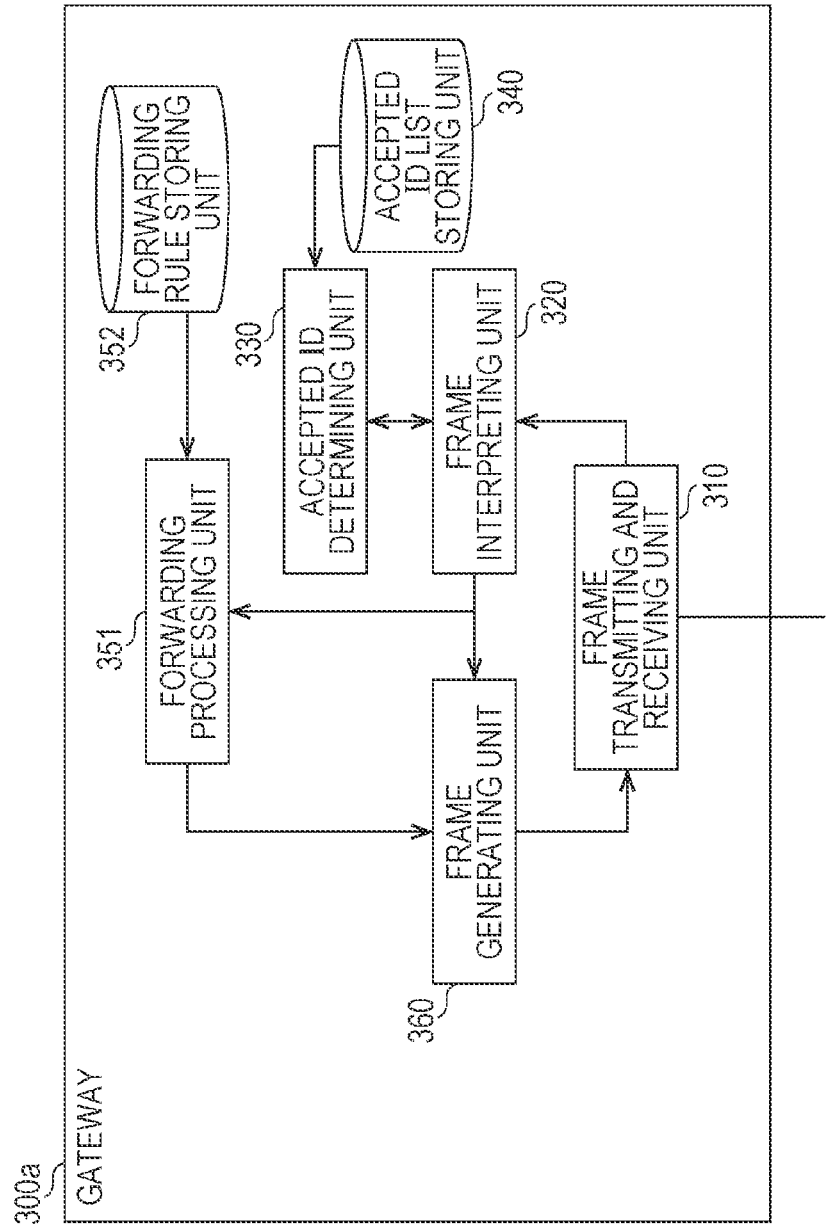
FIG. 12 is a configuration diagram of a gateway according to Embodiment 1.

FIG. 12 is a configuration diagram of the gateway 300a. The gateway 300a is configured to include a frame transmitting and receiving unit 310, a frame interpreting unit 320, an accepted ID determining unit 330, an accepted ID list storing unit 340, a forwarding processing unit 351, a forwarding rule storing unit 352, and a frame generating unit 360. Note that the gateway 300b also has a similar configuration. These respective structural elements are functional structural elements, and the respective functions are realized by components in the gateway 300a, such as a communication circuit, a processor that executes a control program stored in memory, or a digital circuit.

The frame transmitting and receiving unit 310 transmits and receives frames in accordance with the CAN protocol to and from each of the buses 200a, 200b, and 200c. The frame transmitting and receiving unit 310 receives a frame one bit at a time from a bus, and forwards the received frame to the frame interpreting unit 320. Additionally, based on bus information indicating the bus of the destination and a frame reported by the frame generating unit 360, the frame transmitting and receiving unit 310 transmits the content of the frame one bit at a time to the buses 200a, 200b, and 200c.

The frame interpreting unit 320 receives the values of a frame from the frame transmitting and receiving unit 310, and conducts interpretation to map the values to each field in the frame format prescribed by the CAN protocol. The value determined to be the ID field is forwarded to the accepted ID determining unit 330. Depending on a determination result reported by the accepted ID determining unit 330, the frame interpreting unit 320 decides whether to forward the value of the ID field and the data field (data) appearing after the ID field to the forwarding processing unit 351, or stop the reception of the frame after receiving the determination result (in other words, stop interpretation for that frame). In addition, in the case of determining that the frame does not adhere to the CAN protocol, the frame interpreting unit 320 notifies the frame generating unit 360 to transmit an error frame. Also, if an error frame is received, or in other words, if a received frame is interpreted to be an error frame from a value in the frame, the frame interpreting unit 320 discards the rest of the frame, or in other words, stops interpretation of the frame.

The accepted ID determining unit 330 receives the value of the ID field reported by the frame interpreting unit 320, and follows a message ID list stored by the accepted ID list storing unit 340 to determine whether or not to receive each field in the frame following the ID field. The accepted ID determining unit 330 reports the determination result to the frame interpreting unit 320.

The accepted ID list storing unit 340 stores an accepted ID list (see FIG. 6), which is a list of IDs (message IDs) that the gateway 300a is to receive.

The forwarding processing unit 351 follows forwarding rules stored by the forwarding rule storing unit 352 to decide the bus to forward to according to the message ID of the received frame, and reports to the frame generating unit 360 bus information indicating the bus to forward to, as well as the message ID and data reported by the frame interpreting unit 320. Note that the gateway 300a does not forward an error frame received from one bus to the other buses.

The forwarding rule storing unit 352 stores forwarding rules, which are information expressing rules for forwarding frames for each bus. FIG. 13 is a diagram illustrating an example of forwarding rules.

The frame generating unit 360 constructs an error frame in accordance with a notification of instructions to transmit an error frame from the frame interpreting unit 320, and passes the error frame to the frame transmitting and receiving unit 310 for transmission. In addition, the frame generating unit 360 constructs a frame using the message ID and data reported by the forwarding processing unit 351, and passes the frame and the bus information to the frame transmitting and receiving unit 310.

1.13 Forwarding Rules Example

FIG. 13 illustrates an example of forwarding rules stored by the gateway 300a and the gateway 300b. These forwarding rules associate a forwarding source bus, a forwarding destination bus, and a forwarding target ID (message ID). In FIG. 13, "*" Indicates that frames are forwarded regardless of the message ID. Also, in FIG. 13, "-" Indicates that there are no forwarding target frames. The example in FIG. 13 indicates that frames received from the bus 200a are configured to be forwarded to the bus 200b and the bus 200c, regardless of the message ID. The example in FIG. 13 also indicates that, among the frames received from the bus 200b, all frames are configured to be forwarded to the bus 200c, but only the frames having a message ID of "3" are configured to be forwarded to the bus 200a. The example in FIG. 13 also indicates that the frames received from the bus 200c are configured not to be forwarded to the bus 200b.

1.14 Configuration of Fraud Detecting ECU 400a

Figure 14:
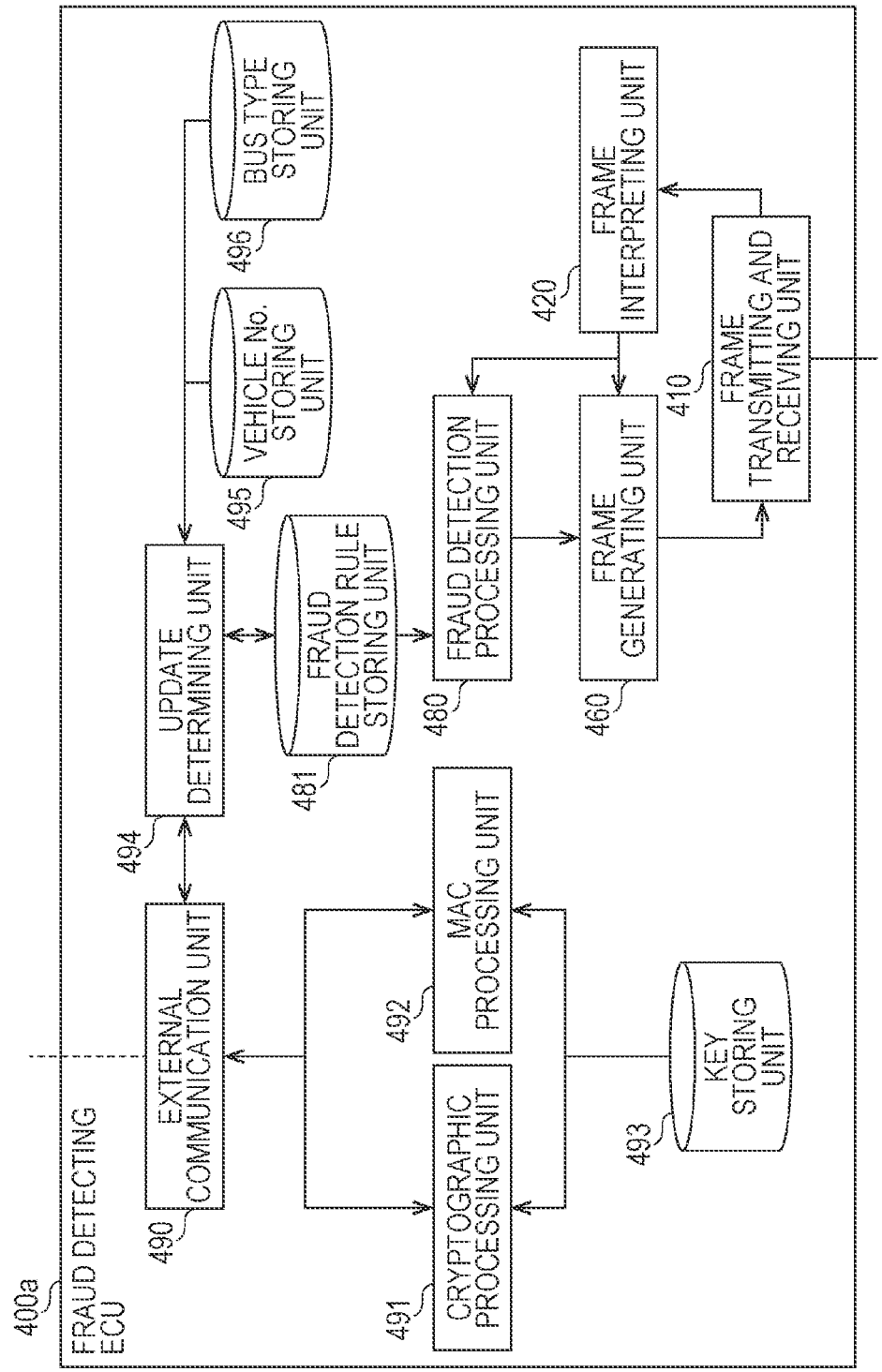
FIG. 14 is a configuration diagram of a fraud detecting ECU according to Embodiment 1.

FIG. 14 is a configuration diagram of the fraud detecting ECU 400a. The fraud detecting ECU 400a is configured to include a frame transmitting and receiving unit 410, a frame interpreting unit 420, a frame generating unit 460, a fraud detection processing unit 480, a fraud detection rule storing unit 481, an external communication unit 490, a cryptographic processing unit 491, a MAC processing unit 492, a key storing unit 493, an update determining unit 494, a vehicle no. storing unit 495, and a bus type storing unit 496. These respective structural elements are functional structural elements, and the respective functions are realized by components in the fraud detecting ECU 400a, such as a communication circuit, a processor that executes a control program stored in memory, or a digital circuit. Note that the fraud detecting ECU 400b and the fraud detecting ECU 400c likewise are equipped with a basically similar configuration, but the contents stored in the fraud detection rule storing unit 481 (fraud detection rules and version information) may be different from each other.

The frame transmitting and receiving unit 410 transmits and receives frames in accordance with the CAN protocol to and from the bus 200a. In other words, the frame transmitting and receiving unit 410 receives a frame one bit at a time from the bus 200a, and forwards the received frame to the frame interpreting unit 420. Additionally, the frame transmitting and receiving unit 410 transmits the content of a frame reported by the frame generating unit 460 to the bus 200a.

The frame interpreting unit 420 receives the values of a frame from the frame transmitting and receiving unit 410, and conducts interpretation to map the values to each field in the frame format prescribed by the CAN protocol. The value determined to be the ID field is forwarded to the fraud detection processing unit 480. In addition, in the case of determining that the frame does not adhere to the CAN protocol, the frame interpreting unit 420 notifies the frame generating unit 460 to transmit an error frame. Also, if an error frame is received, or in other words, if a received frame is interpreted to be an error frame from a value in the frame, the frame interpreting unit 420 discards the rest of the frame, or in other words, stops interpretation of the frame.

The frame generating unit 460 constructs an error frame in accordance with a notification of instructions to transmit an error frame from the frame interpreting unit 420, and passes the error frame to the frame transmitting and receiving unit 410 for transmission. Additionally, the frame generating unit 460 constructs an error frame in accordance with a notification of instructions to transmit an error frame from the fraud detection processing unit 480, and passes the error frame to the frame transmitting and receiving unit 410 for transmission.

The fraud detection processing unit 480 includes a function of determining whether or not a frame acquired from the bus 200a is malicious, based on the fraud detection rules stored by the fraud detection rule storing unit 481. In the present embodiment, a list of message IDs which are not malicious, also called a whitelist, is used as the fraud detection rules. Specifically, the fraud detection processing unit 480 receives the value of the ID field (ID) reported by the frame interpreting unit 420, and if the ID is not listed on the list of message IDs (whitelist) that serves as the fraud detection rules, the fraud detection processing unit 480 notifies the frame generating unit 460 to transmit an error frame. In this case, on the bus 200a, the bit values of the frame (malicious frame) Including the ID not listed on the list of message IDs that serves as the fraud detection rules are overwritten by an error frame made up of a series of multiple dominant bits which take priority over recessive bits.

The fraud detection rule storing unit 481 stores a list prescribing the message IDs included in frames transmitted from the bus 200a as the fraud detection rules, and stores version information indicating the version of the fraud detection rules (see FIG. 15). Additionally, according to a notification of new fraud detection rules from the update determining unit 494 (also designated updated fraud detection rules), the fraud detection rule storing unit 481 updates the previously stored fraud detection rules with the updated fraud detection rules, and reports the updated result to the update determining unit 494.

Figures 17, 18:
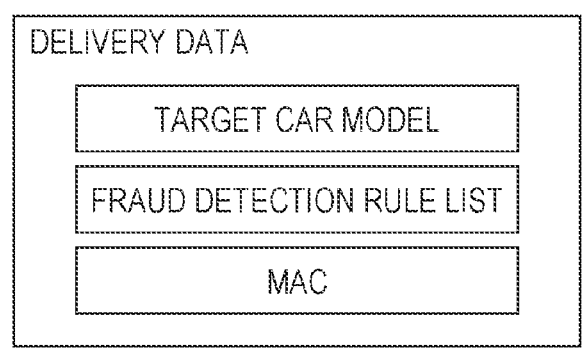
FIG. 17 is a diagram illustrating an example of fraud detection rules and version information stored by a fraud detecting ECU according to Embodiment 1.
FIG. 18 is a diagram illustrating an example of a delivery data format according to Embodiment 1.
Figures 19, 20:
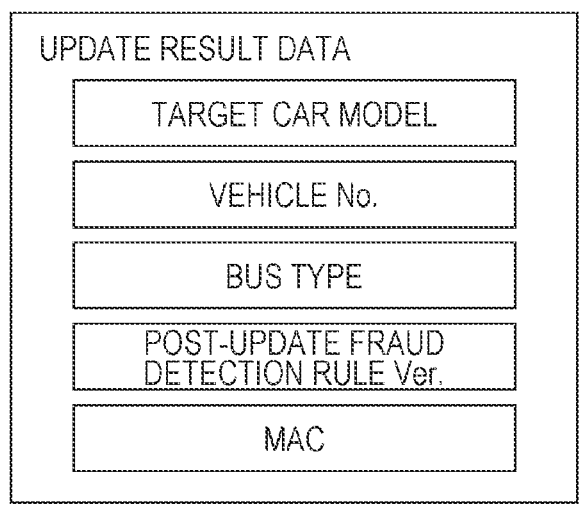
FIG. 19 is a diagram illustrating an example of delivery data according to Embodiment 1.
FIG. 20 is a diagram illustrating an example of an update result data format according to Embodiment 1.

The external communication unit 490 communicates with the server 500 via the network 600, and thereby acquires delivery data including information such as updated fraud detection rules (new fraud detection rules) for updating the fraud detection rules. Additionally, the external communication unit 490 reports update result data to the server 500 via the network 600. The external communication unit 490 transmits acquired delivery data to the cryptographic processing unit 491, and acquires a decrypted result. Additionally, the external communication unit 490 reports a message authentication code (MAC) that serves as validation data in the decrypted delivery data to the MAC processing unit 492, and receives a MAC validation result. The external communication unit 490 extracts updated fraud detection rules and associated information (such as the target car model, bus type, and version information) from the decrypted delivery data, and reports the extracted information to the update determining unit 494. Additionally, based on information such as a fraud detection rule update result received from the update determining unit 494, the external communication unit 490 generates and reports update result data to the MAC processing unit 492, and receives update result data including a generated MAC. FIG. 18 illustrates an example of the delivery data format, and FIG. 19 illustrates an example of delivery data. Also, FIG. 20 illustrates an example of the update result data format, and FIG. 21 illustrates an example of update result data. Delivery data delivered from the server 500 has been subjected to an encryption process. Herein, the cryptographic process performed by the server 500 may include encryption and the attachment of validation data, for example. Correspondingly, the cryptographic processing unit 491 and the MAC processing unit 492 execute cryptographic processes on the delivery data corresponding to the cryptographic process executed by the server 500 (for example, decryption corresponding to the encryption, and validation corresponding to the attachment of validation data).

The cryptographic processing unit 491 uses a key acquired from the key storing unit 493 to decrypt the encrypted delivery data reported by the external communication unit 490, and reports the decrypted delivery data to the external communication unit 490.

The MAC processing unit 492 uses a key acquired from the key storing unit 493 to validate the MAC in the delivery data reported by the external communication unit 490, and reports a validation result to the external communication unit 490. Additionally, based on update result data reported by the external communication unit 490, the MAC processing unit 492 uses a key acquired from the key storing unit 493 to generate a MAC, includes the MAC in the update result data, and reports the update result data with the included MAC to the external communication unit 490.

The key storing unit 493 manages keys used in the cryptographic processes by the cryptographic processing unit 491 and the MAC processing unit 492.

The update determining unit 494 receives updated fraud detection rules and associated information from the external communication unit 490, and based on a bus type acquired from the bus type storing unit 496, a car model stored by the vehicle no. storing unit 495, and version information corresponding to the fraud detection rules stored by the fraud detection rule storing unit 481, determines whether or not updating the fraud detection rules stored by the fraud detection rule storing unit 481 is necessary. In the case of determining that updating is necessary, the update determining unit 494 notifies the fraud detection rule storing unit 481 and updates the fraud detection rules. In addition, the update determining unit 494 reports the update result and a vehicle no. acquired from the vehicle no. storing unit 495 to the external communication unit 490.

The vehicle no. storing unit 495 stores a vehicle number (vehicle no.) indicating an identifier of the vehicle in which the fraud detecting ECU 400a is Installed on-board, and the car model of the vehicle (vehicle type).

The bus type storing unit 496 stores the type of the bus to which the fraud detecting ECU 400a is connected. The bus type may be a type such as "drive", "body", or "safety", for example. "Drive" is a type of bus to which are connected ECUs that include driving functions related to the running of the vehicle, such as control of components like the engine, motor, fuel, battery, and transmission, for example. "Body" is a type of bus to which are connected ECUs that include body functions related to the control of vehicle furnishings, such as the door locks, air conditioning, lights, and turn signals, for example. "Safety" is a type of bus to which are connected ECUs that include safety functions for automatically realizing safe and comfortable driving, such as automatic braking, a lane keeping function, an inter-vehicle gap keeping function, an anti-collision function, and airbags, for example. For example, the bus 200a, to which are connected ECUs related to the running of the vehicle, namely the ECU 100a related to the engine and the ECU 100b related to the brake, Is a "drive" bus. Also, the bus 200b to which are connected ECUs related to the control of vehicle furnishings, namely the ECU 100c related to the door open/close sensor and the ECU 100d related to the window open/close sensor, Is a "body" bus. Also, the bus 200c, to which is connected an ECU related to an anti-collision function, namely the ECU 100e related to the corner sensor, is a "safety" bus.

1.15 Example of Fraud Detection Rules in Fraud Detecting ECU 400a

FIG. 15 is a diagram illustrating an example of fraud detection rules and version information stored by the fraud detecting ECU 400a. The fraud detection rules (a list of legitimate message IDs) illustrated in FIG. 15 indicate that if a frame (message) transmitted on the bus 200a connected to the fraud detecting ECU 400a does not have a message ID corresponding to any of "1", "2", and "3", the frame is malicious. Also, the version information Indicates that the version (Ver.) of the fraud detection rules is 1.0.

1.16 Example of Fraud Detection Rules in Fraud Detecting ECU 400b

FIG. 16 is a diagram illustrating an example of fraud detection rules and version information stored by the fraud detecting ECU 400b. The fraud detection rules illustrated in FIG. 16 indicate that if a frame transmitted on the bus 200b connected to the fraud detecting ECU 400b does not have a message ID corresponding to any of "1", "2", "3", and "4", the frame is malicious. Also, the version information Indicates that the version (Ver.) of the fraud detection rules is 1.0.

1.17 Example of Fraud Detection Rules in Fraud Detecting ECU 400c

FIG. 17 is a diagram illustrating an example of fraud detection rules and version information stored by the fraud detecting ECU 400c. The fraud detection rules illustrated in FIG. 17 indicate that if a frame transmitted on the bus 200c connected to the fraud detecting ECU 400c does not have a message ID corresponding to any of "1", "2", "3", "4", and "5", the frame is malicious. Also, the version information indicates that the version (Ver.) of the fraud detection rules is 1.0.

1.18 Delivery Data Format Example

FIG. 18 illustrates an example of a format for delivery data transmitted from the server 500 to the fraud detecting ECUs 400a to 400c (delivery data format). The delivery data format in FIG. 18 indicates that delivery data is configured to include a target car model, a fraud detection rule list, and a MAC. The target car model indicates the car model of the vehicle (vehicle type) Including an on-board fraud detecting ECU that should update to the updated fraud detection rules (new fraud detection rules) Included in the fraud detection rule list of the delivery data. The fraud detection rule list includes respective fraud detection rules (updated fraud detection rules) for each type of bus included in the on-board network in the vehicle of the target car model.

1.19 Delivery Data Example

FIG. 19 illustrates an example of the content of delivery data. In the example illustrated in FIG. 19, the delivery data is for a car model A, and expresses fraud detection rules (updated fraud detection rules) to be used to detect malicious frames on each of "drive", "body", and "safety" buses indicated by the target bus type (bus type information), as well as corresponding version information (fraud detection rule Ver.). In this way, the delivery data is configured to include one or more (in the example of FIG. 19, multiple)

updated fraud detection rules, and associated information (such as the target car model, bus type, and version information).

1.20 Update Result Data Format Example

FIG. 20 illustrates an example of a format for update result data transmitted from the fraud detecting ECUs 400a to 400c to the server 500 (update result data format). The update result data format illustrated in FIG. 20 indicates that update result data is configured to include a target car model, a vehicle no., a bus type, a post-update fraud detection rule version (Ver.), and a MAC. The target car model and the vehicle no. of the update result data indicate the car model and the vehicle no. of the vehicle including the on-board fraud detecting ECU acting as the transmission source of the update result data. Additionally, the bus type of the update result data indicates the bus type of the bus to which is connected the fraud detecting ECU acting as the transmission source of the update result data (in other words, the bus type stored by the bus type storing unit 496). The post-update fraud detection rule ver. of the update result data is a version indicated by the version information corresponding to the fraud detection rules updated in the fraud detecting ECU acting as the transmission source of the update result data.

1.21 Update Result Data Example

FIG. 21 illustrates an example of the content of update result data. The example illustrated in FIG. 21 indicates that "as a result of the fraud detecting ECU connected to the drive bus in vehicle no. 00000001 of car model A receiving delivery data, the fraud detection rules were updated to version 2.0". If an update is not performed as a result of a fraud detecting ECU receiving delivery data, the fraud detection rule ver. In the update result data may indicate "-" (none) to express that no update was performed, for example.

1.22 Configuration of Server 500

Figure 22:
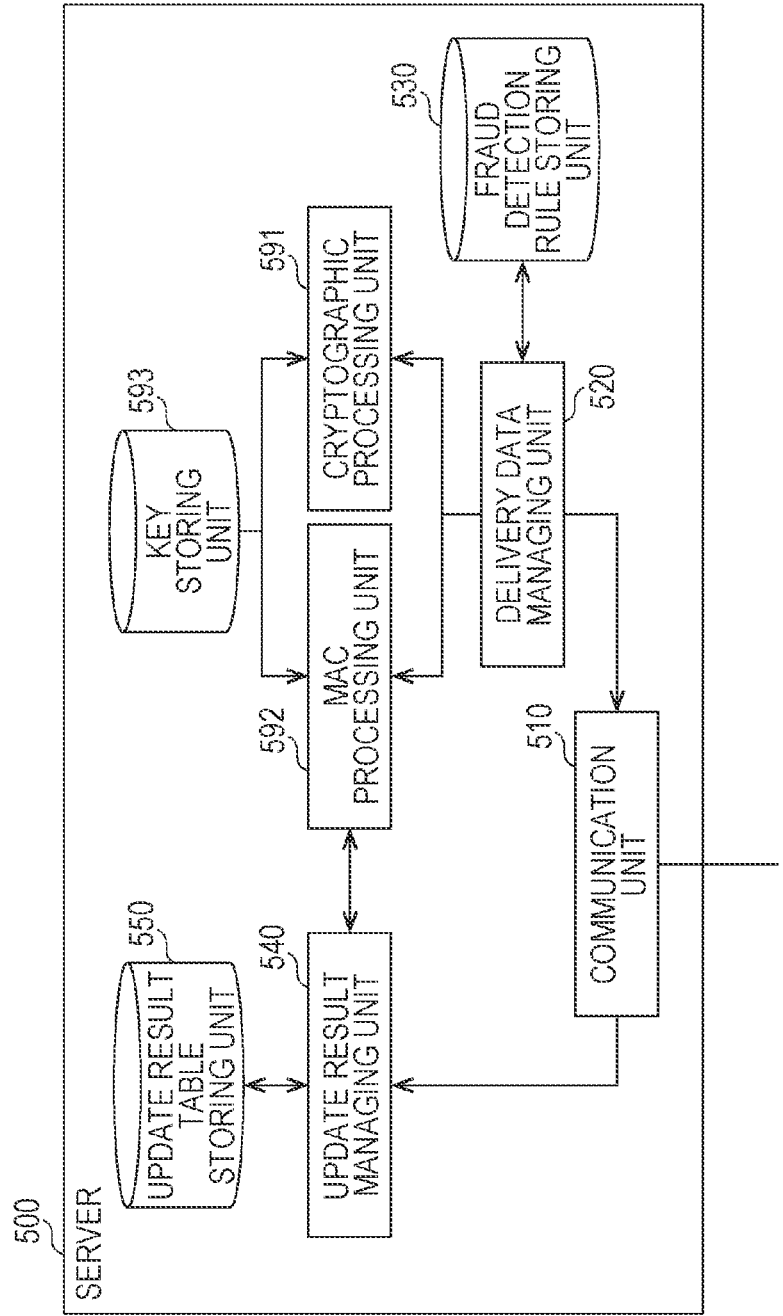
FIG. 22 is a configuration diagram of a server according to Embodiment 1.

FIG. 22 is a configuration diagram of the server 500. The server 500 is a computer existing externally to the vehicle in which the on-board network system 10 is installed on-board. The server 500, acting under the presupposition that the on-board network system 10 is installed on-board each of multiple vehicles, transmits delivery data including fraud detection rules (updated fraud detection rules) to each vehicle (that is, each on-board network system), and manages the update status of the fraud detection rules in each vehicle.

As illustrated in FIG. 22, the server 500 is configured to include a communication unit 510, a delivery data managing unit 520, a fraud detection rule storing unit 530, a cryptographic processing unit 591, a MAC processing unit 592, a key storing unit 593, an update result managing unit 540, and an update result table storing unit 550. These respective structural elements are functional structural elements, and the respective functions are realized by components in the server 500, like storage media such as a hard disk and memory, a processor that executes a control program stored in memory, and a communication circuit.

The communication unit 510 transmits delivery data reported by the delivery data managing unit 520 to the fraud detecting ECUs 400a to 400c via the network 600. Additionally, the communication unit 510 receives update result data from the fraud detecting ECUs 400a to 400c, and reports received update result data to the update result managing unit 540.

The delivery data managing unit 520 acquires, from the fraud detection rule storing unit 530, the latest version of the fraud detection rules and associated information corresponding to the fraud detection rules (such as the target car model, bus type, and version information). The delivery data managing unit 520 reports the acquired fraud detection rules and associated information to the MAC processing unit 592 to acquire a MAC, and then reports the acquired fraud detection rules, association information, and MAC to the cryptographic processing unit 591 to acquire encrypted delivery data (see FIGS. 18 and 19). Consequently, a MAC used for validation is added to the delivery data, and the delivery data is subjected to the cryptographic process of encryption.

The fraud detection rule storing unit 530 stores, on a device such as a recording medium, the latest version of fraud detection rules (In other words, updated fraud detection rules to be used for updating in each on-board network system 10) and associated information corresponding to the fraud detection rules. Note that the fraud detection rules and the associated information are stored on a device such as a recording medium of the fraud detection rule storing unit 530 according to operations performed by a person such as an administrator or operator of the server 500, or by receiving data from another computer. Note that the entity who decides the fraud detection rules may update the fraud detection rules as required in response to changes in the communication specifications for each car model. Additionally, fraud detection rules that differ for specific vehicles or each bus type may be generated.

The cryptographic processing unit 591 uses a key acquired from the key storing unit 593 to encrypt data reported by the delivery data managing unit 520, and reports encrypted delivery data to the delivery data managing unit 520.

The MAC processing unit 592 uses a key acquired from the key storing unit 593 and the data reported from the delivery data managing unit 520 to generate a MAC, and reports the generated MAC to the delivery data managing unit 520. Additionally, the MAC processing unit 592 uses a key acquired from the key storing unit 593 to validate a MAC included in update result data reported by the update result managing unit 540, and reports a validation result to the update result managing unit 540.

The key storing unit 593 manages keys used in the cryptographic processes by the cryptographic processing unit 591 and the MAC processing unit 592.

The update result managing unit 540 updates an update result table stored by the update result table storing unit 550, based on update result data reported by the communication unit 510 (see FIGS. 20 and 21) and the times when such update result data is received.

The update result table storing unit 550 stores an update result table for the fraud detecting ECUs 400a to 400c. FIG. 23 illustrates an example of an update result table.

1.23 Update Result Table

FIG. 23 illustrates an example of an update result table stored by the server 500. In the update result table illustrated in FIG. 23, the post-update version and the last update time of the fraud detection rules for each fraud detecting ECU connected to various types of buses in a vehicle of car model A with the vehicle no. 00000001 are stated and managed. For the last update time, the time at which the update result managing unit 540 received a notification of update result data may be set, for example. Note that although the update result table illustrated as an example in FIG. 23 indicates data related to the update results for a vehicle of car model A with the vehicle no. 00000001, by having the server 500 transmit delivery data to the fraud detecting ECUs of multiple vehicles, the update result table may include data related to the update results of fraud detection rules for multiple vehicles with different car models and vehicle numbers.

1.24 Sequence Related to Malicious Frame Detection

Hereinafter, the operation of devices such as the fraud detecting ECU 400a, the ECU 100a, the ECU 100b, and the gateway 300a connected to the bus 200a will be described for a case in which a malicious ECU is connected to the bus 200a of the on-board network system 10.

Figure 24:
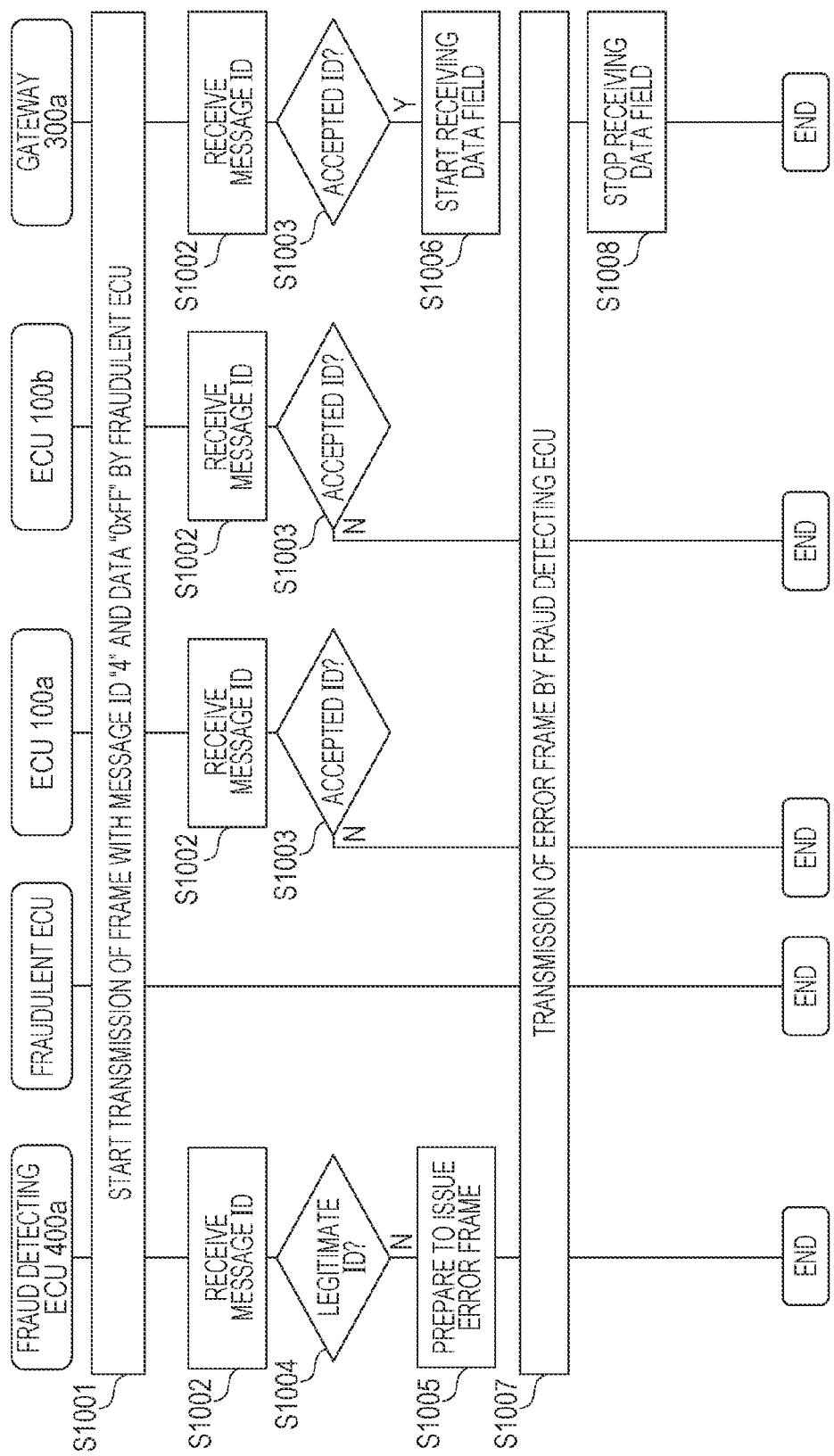
FIG. 24 is a sequence diagram illustrating example operations related to malicious frame detection and execution prevention according to Embodiment 1.

FIG. 24 is a sequence diagram illustrating exemplary operations by which the fraud detecting ECU 400a detects a malicious frame (message), and prevents processing corresponding to the malicious frame from being conducted by other ECUs. FIG. 24 illustrates an example of a case in which a malicious ECU transmits, on the bus 200a, a data frame having a message ID of "4" and a data field (data) of "255 (0xFF)". Each sequence indicates the respective processing procedure (steps) in each device.

First, the malicious ECU starts the transmission of a data frame having a message ID of "4" and data of "255 (0xFF)" (step S1001). The value of each bit constituting the frame is sent out successively over the bus 200a in the order of the SOF, the ID field (message ID), and so on, following the frame format discussed earlier.

When the malicious ECU finishes sending out up to the ID field (message ID) over the bus 200a, each of the fraud detecting ECU 400a, the ECU 100a, the ECU 100b, and the gateway 300a receives the message ID (step S1002).

Each of the ECU 100a, the ECU 100b, and the gateway 300a checks the message ID using a stored accepted ID list (step S1003). At this point, the fraud detecting ECU 400a checks the message ID using a stored list (whitelist) of message IDs that serves as fraud detection rules (step S1004). In other words, the fraud detecting ECU 400a makes a determination of whether or not the content of the ID field in the transmitted frame conforms to the rules, on the basis of the fraud detection rules. In this determination, if the content of the ID field is not on the list of message IDs that serve as the fraud detection rules, it is determined that the content of the ID field does not conform to the rules (in other words, the ID is a malicious message ID, and the transmitted frame is a malicious frame).

In step S1003, since "4" is not included on the accepted ID list stored by each of the ECU 100a and the ECU 100b (see FIG. 4), the ECU 100a and the ECU 100b stop receiving. In other words, the ECU 100a and the ECU 100b stop interpreting the frame that continues to be transmitted by the malicious ECU, and do not conduct processing corresponding to the frame. Meanwhile, in step S1003, since "4" is included on the accepted ID list stored by the gateway 300a (see FIG. 6), the gateway 300a continues to receive the frame. Also, in step S1004, since "4" is not included on the list of message IDs that serves as the fraud detection rules stored by the fraud detecting ECU 400a (see FIG. 15), the fraud detecting ECU 400a judges the message ID to be malicious, and subsequently starts preparations to issue an error frame (step S1005).

After step S1003, the gateway 300a continues to receive the frame. For example, while the fraud detecting ECU 400a is preparing to issue an error frame, the parts of the frame following after the ID field, such as the RTR and the control field (IDE, r, DLC), are sent out successively over the bus 200a from the malicious ECU, and subsequently the data field is sent out successively one bit at a time. The gateway 300a receives the RTR and the control field (IDE, r, DLC), and subsequently starts receiving the data field (step S1006).

Next, the preparations to issue an error frame are finished, and the fraud detecting ECU 400a transmits an error frame (step S1007). This transmission of an error frame is conducted before the end of the malicious frame is transmitted (such as before the end of the CRC sequence is transmitted, for example). In this exemplary operation, the error frame is transmitted partway through the data field. As a result of the error frame transmission being started, on the bus 200a, the partial portion of the data field of the frame being transmitted from the malicious ECU becomes overwritten by the error frame (a prioritized dominant bit sequence).

The gateway 300a, after receiving the error frame transmitted in step S1007, stops receiving the frame that the malicious ECU had been transmitting partway through the reception of the data field (step S1008). In other words, since the data field from the malicious ECU is overwritten by the error frame, and the gateway 300a detects the error frame, the gateway 300a does not continue to receive the frame that the malicious ECU had been transmitting.

1.25 Sequence Related to Updating Fraud Detection Rules

Figure 25:
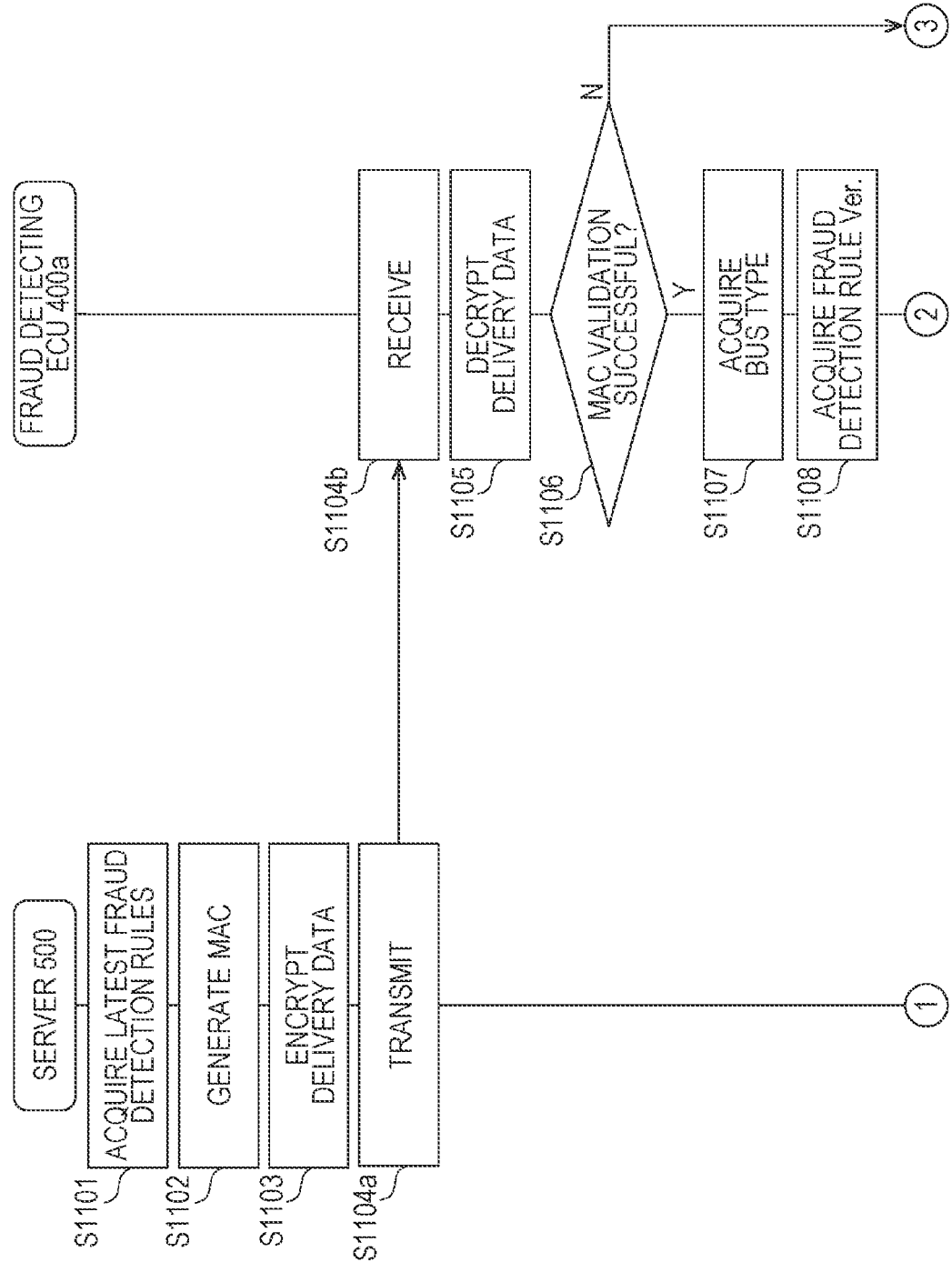
FIG. 25 is a sequence diagram illustrating example operations related to fraud detection rule updating according to Embodiment 1 (continuing to FIG. 26)
Figure 26:
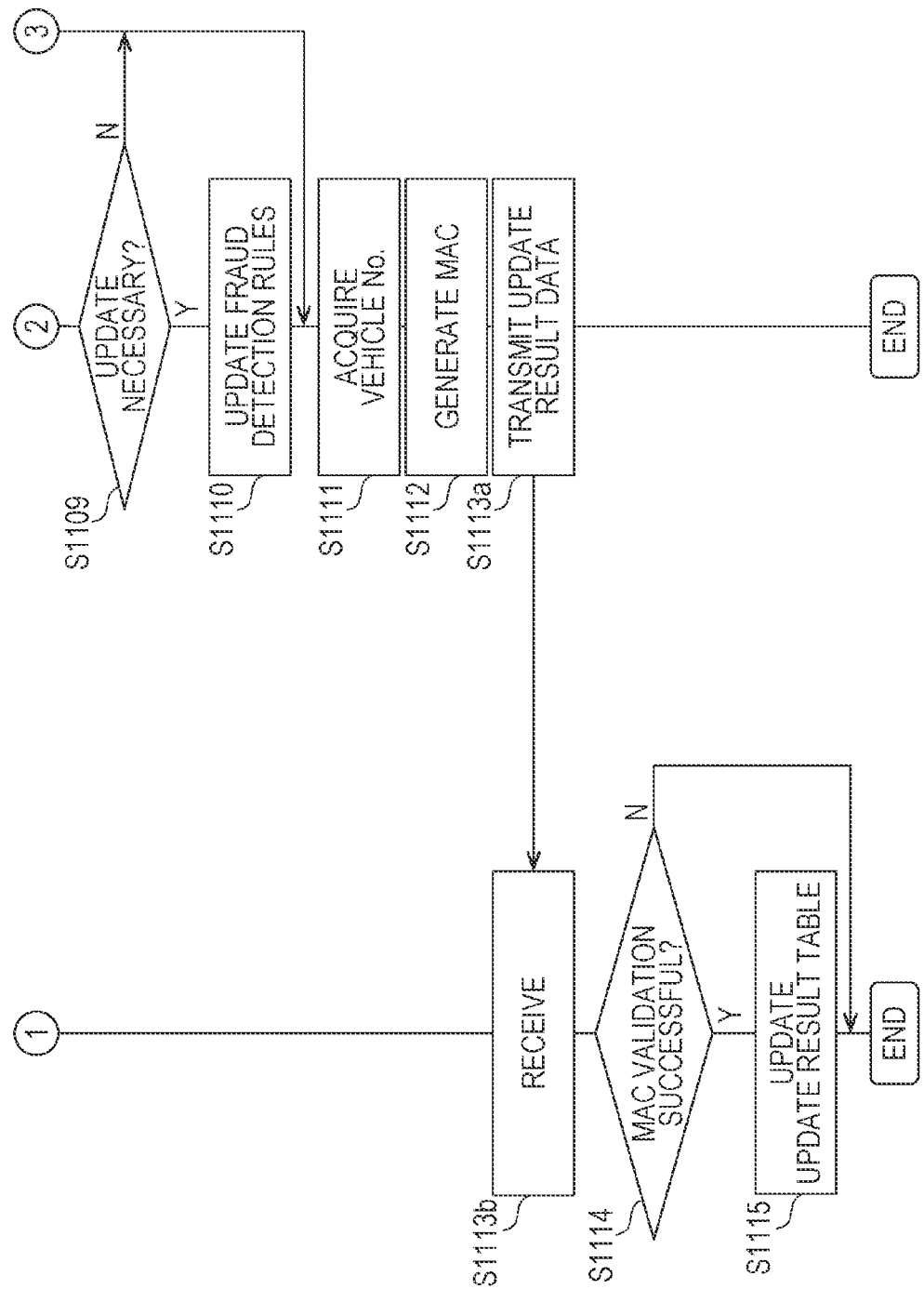
FIG. 26 is a sequence diagram illustrating example operations related to fraud detection rule updating according to Embodiment 1 (continuing from FIG. 25)

FIGS. 25 and 26 are sequence diagrams illustrating exemplary operation related to updating the fraud detection rules. The server 500 may transmit delivery data including updated fraud detection rules to each fraud detecting ECU in each on-board network system 10 of each vehicle, but herein, the description will focus on the updating of the fraud detection rules stored by the fraud detecting ECU 400a.

First, in the server 500, the latest fraud detection rules (in other words, the fraud detection rules to be used for updating in a fraud detecting ECU of an on-board network system 10) and associated information are acquired (step S1101).

The server 500 generates a MAC to attach to the acquired fraud detection rules and associated information (step S1102).

The server 500 constructs delivery data following a certain delivery data format with the fraud detection rules, the associated information, and the MAC, and encrypts the delivery data (step S1103).

Next, the server 500 transmits the encrypted delivery data to the fraud detecting ECU 400a (step S1104a). In response, the fraud detecting ECU 400a receives the delivery data (specifically, the encrypted delivery data) with the external communication unit 490 (step S1104b).

The external communication unit 490 of the fraud detecting ECU 400a causes the cryptographic processing unit 491 to decrypt the encrypted delivery data (step S1105).

Next, the external communication unit 490 of the fraud detecting ECU 400a causes the MAC processing unit 492 to validate the MAC included in the delivery data (step S1106). If the MAC validation is successful, the external communication unit 490 of the fraud detecting ECU 400a informs the update determining unit 494 of the content of the received delivery data, namely the fraud detection rules (updated fraud detection rules) and the associated information (such as the target car model, bus type, and version information).

If the MAC validation in step S1106 is successful, the update determining unit 494 of the fraud detecting ECU 400a acquires from the bus type storing unit 496 the bus type corresponding to the bus 200a to which the fraud detecting ECU 400a is connected (step S1107). Additionally, the update determining unit 494 acquires the car model from the vehicle no. storing unit 495.

Next, the update determining unit 494 of the fraud detecting ECU 400a acquires version information corresponding to the fraud detection rules stored by the fraud detection rule storing unit 481 (step S1108).

Next, the update determining unit 494 of the fraud detecting ECU 400a determines whether or not updating the fraud detection rules according to the delivery data is necessary (step S1109). Specifically, the update determining unit 494 makes the determination by comparing each of the bus type acquired from the bus type storing unit 496, the car model acquired from the vehicle no. storing unit 495, and the version information acquired from the fraud detection rule storing unit 481 with each of the bus type, the car model, and the version indicated by the associated information included in the delivery data (in other words, the target car model, the bus type, and the fraud detection rule ver. In FIG. 19). The update determining unit 494 determines that updating is necessary only in the case in which the car model and the bus type match, and additionally, the version of the updated fraud detection rules in the content of the delivery data is a newer version than the version of the fraud detection rules already being used by the fraud detecting ECU 400a.

If it is determined that updating is necessary in step S1109, the update determining unit 494 of the fraud detecting ECU 400a updates the fraud detection rules being stored by the fraud detection rule storing unit 481 to the fraud detection rules included in the delivery data (updated fraud detection rules) (step S1110). In other words, the fraud detecting ECU 400a extracts, from the delivery data received from the server 500, the updated fraud detection rules corresponding to the bus type information (target bus type) applicable to the type of the connected bus, and updates the fraud detection rules being stored by the fraud detection rule storing unit 481 to the extracted updated fraud detection rules.

In the case of updating in step S1110, the case in which MAC validation fails in step S1106, or the case of determining that updating is not necessary in step S1109, the update determining unit 494 acquires the vehicle no. from the vehicle no. storing unit 495 (step S1111), and informs the external communication unit 490 of the acquired vehicle no. and update result data indicating the update result. The update result data (see FIG. 21) uses the fraud detection rule ver. to indicate the version of the post-update fraud detection rules if an update is performed, or indicate no update if an update is not performed.

Next, in the external communication unit 490, update result data is generated based on the update result, and the MAC processing unit 492 is made to generate a MAC based on the update result data and include the MAC in the update result data (step S1112). Subsequently, the external communication unit 490 transmits the update result data to the server 500 (step S1113a).

In the server 500, the update result data is received (step S1113b), and the MAC in the update result data is validated (step S1114).

If the MAC validation is successful, the server 500 updates the update result table (see FIG. 23) based on the update result data (step S1115). If the MAC validation fails in step S1114, the server 500 does not update the update result table.

1.26 Advantageous Effects of Embodiment 1

In the on-board network system 10 according to Embodiment 1, it is determined whether or not to update fraud detection rules that serve as a basis for determining, in a fraud detecting ECU, whether or not a frame transmitted on a bus is malicious. Consequently, it becomes possible to update the fraud detection rules as required. In addition, since the determination of whether or not to update is made according to the type of bus to which the fraud detecting ECU is connected, the updating of fraud detection rules may be realized independently for each type of bus. In addition, since the server that delivers the fraud detection rules to use for updating is able to deliver the latest version of the fraud detection rules corresponding to each bus type uniformly, the processing load may be reduced compared to selecting and transmitting update content individually. Additionally, since update result data is report to the server, in the server, control such as managing the update results and resending the delivery data as necessary becomes possible.

1.27 Modification of Embodiment 1

Hereinafter, in the on-board network system 10 discussed above, an example of replacing the fraud detecting ECUs 400a to 400c with fraud detecting ECUs 1400a to 1400c, which are partial modifications of the fraud detecting ECUs 400a to 400c, will be described.

In the fraud detecting ECU 1400a, which is a partial modification of the fraud detecting ECU 400a, in the determination of whether or not to update the fraud detection rules, a vehicle status about the vehicle in which the fraud detecting ECU 1400a is installed on-board (such as a moving status, like moving or stopped, for example) is additionally referenced. Consequently, the fraud detecting ECU 1400a does not update the fraud detection rules unless the vehicle status is a certain status with high safety (such as stopped or parked, for example).

1.28 Configuration of Fraud Detecting ECU 1400a

Figure 27:
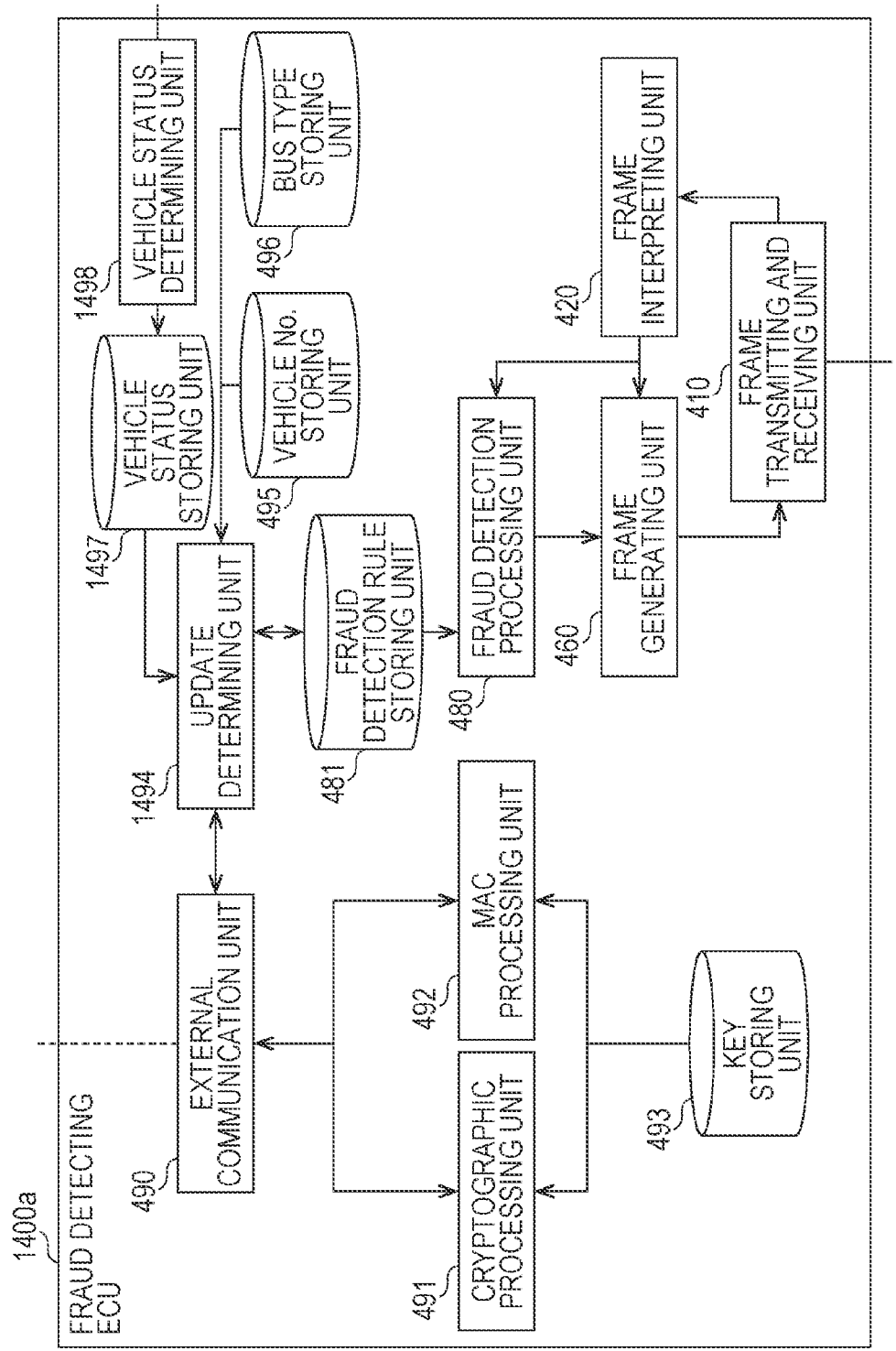
FIG. 27 is a configuration diagram of a fraud detecting ECU according to a modification of Embodiment 1.

FIG. 27 is a configuration diagram of the fraud detecting ECU 1400a. The fraud detecting ECU 1400a is configured to include a frame transmitting and receiving unit 410, a frame interpreting unit 420, a frame generating unit 460, a fraud detection processing unit 480, a fraud detection rule storing unit 481, an external communication unit 490, a cryptographic processing unit 491, a MAC processing unit 492, a key storing unit 493, an update determining unit 1494, a vehicle no. storing unit 495, a bus type storing unit 496, a vehicle status storing unit 1497, and a vehicle status determining unit 1498. These respective structural elements are functional structural elements, and the respective functions are realized by components in the fraud detecting ECU 1400, such as a communication circuit, a processor that executes a control program stored in memory, or a digital circuit. Note that the fraud detecting ECU 1400b replacing the fraud detecting ECU 400b and the fraud detecting ECU 1400c replacing the fraud detecting ECU 400c likewise are equipped with a basically similar configuration, but the contents stored in the fraud detection rule storing unit 481

(fraud detection rules and version information) may be different from each other. Structural elements which are the same as Embodiment 1 (FIG. 14) are denoted with the same signs, and the description thereof will be reduced or omitted.

The update determining unit 1494 receives updated fraud detection rules and associated information from the external communication unit 490, and based on a bus type acquired from the bus type storing unit 496, a car model stored by the vehicle no. storing unit 495, version information corresponding to the fraud detection rules stored by the fraud detection rule storing unit 481 and a vehicle status stored by the vehicle status storing unit 1497, determines whether or not updating the fraud detection rules stored by the fraud detection rule storing unit 481 is necessary. In the case of determining that updating is necessary, the update determining unit 1494 notifies the fraud detection rule storing unit 481 and updates the fraud detection rules. In addition, the update determining unit 494 reports the update result and a vehicle no. acquired from the vehicle no. storing unit 495 to the external communication unit 490.

The vehicle status storing unit 1497 receives and stores the vehicle status from the vehicle status determining unit 1498. For the vehicle status, besides statuses related to the running of the vehicle, various statuses specifiable by methods such as measurement in the vehicle may be used. Herein, the vehicle status is described as being either "moving" or "stopped".

The vehicle status determining unit 1498 determines the current vehicle status by acquiring information such as a measurement value measured by a sensor such as a speed sensor (not illustrated), and informs the vehicle status storing unit 1497 of the vehicle status as a determination result. Note that the vehicle status determining unit 1498 may be configured to include a sensor such as a speed sensor, communicate with an external sensor such as a speed sensor over a dedicated communication link, or receive information such as a measurement value via the bus 200a from an ECU connected to such an external sensor.

1.29 Sequence Related to Updating Fraud Detection Rules

Figure 28:
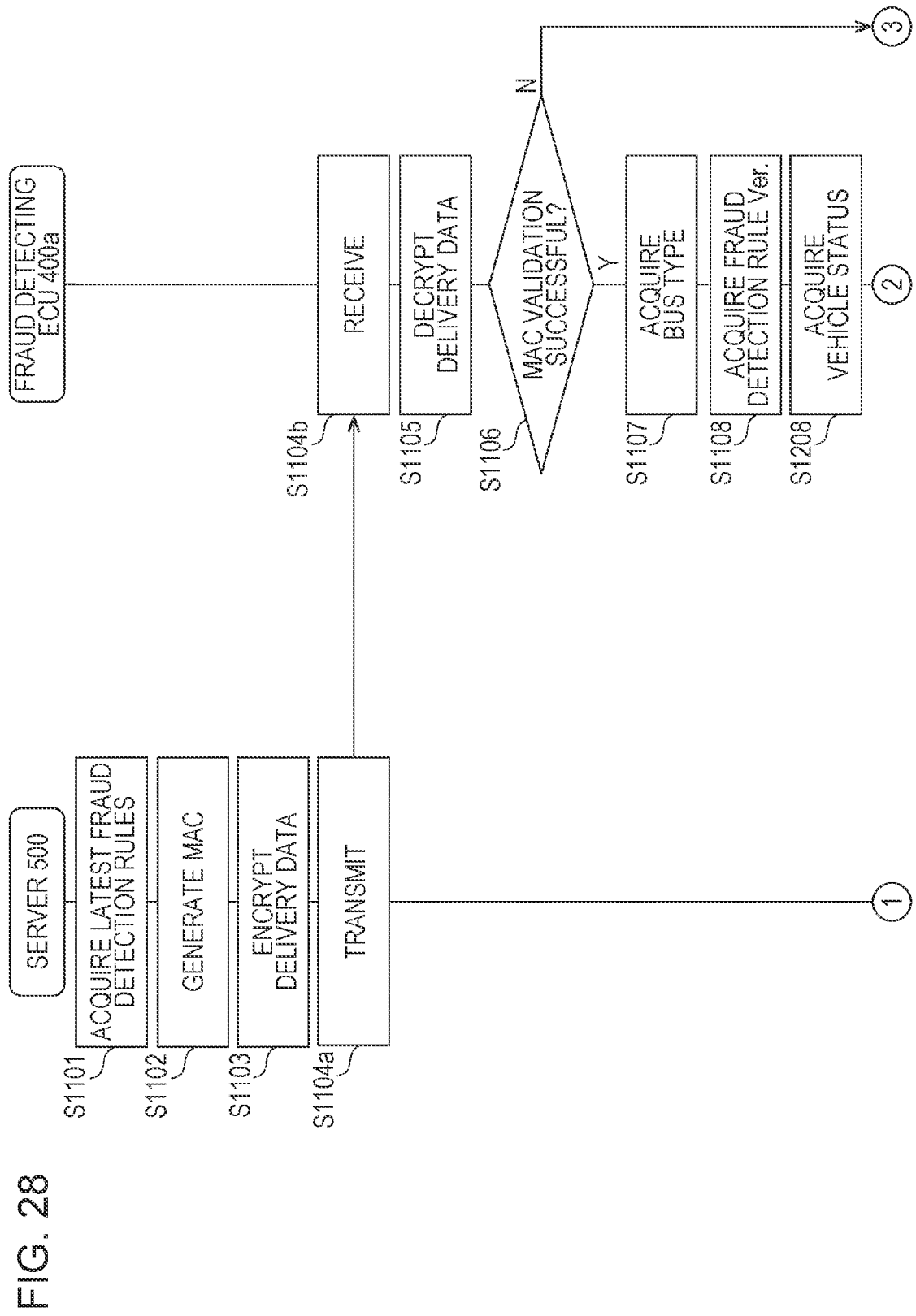
FIG. 28 is a sequence diagram illustrating example operations related to fraud detection rule updating according to a modification of Embodiment 1 (continuing to FIG. 29)
Figure 29:
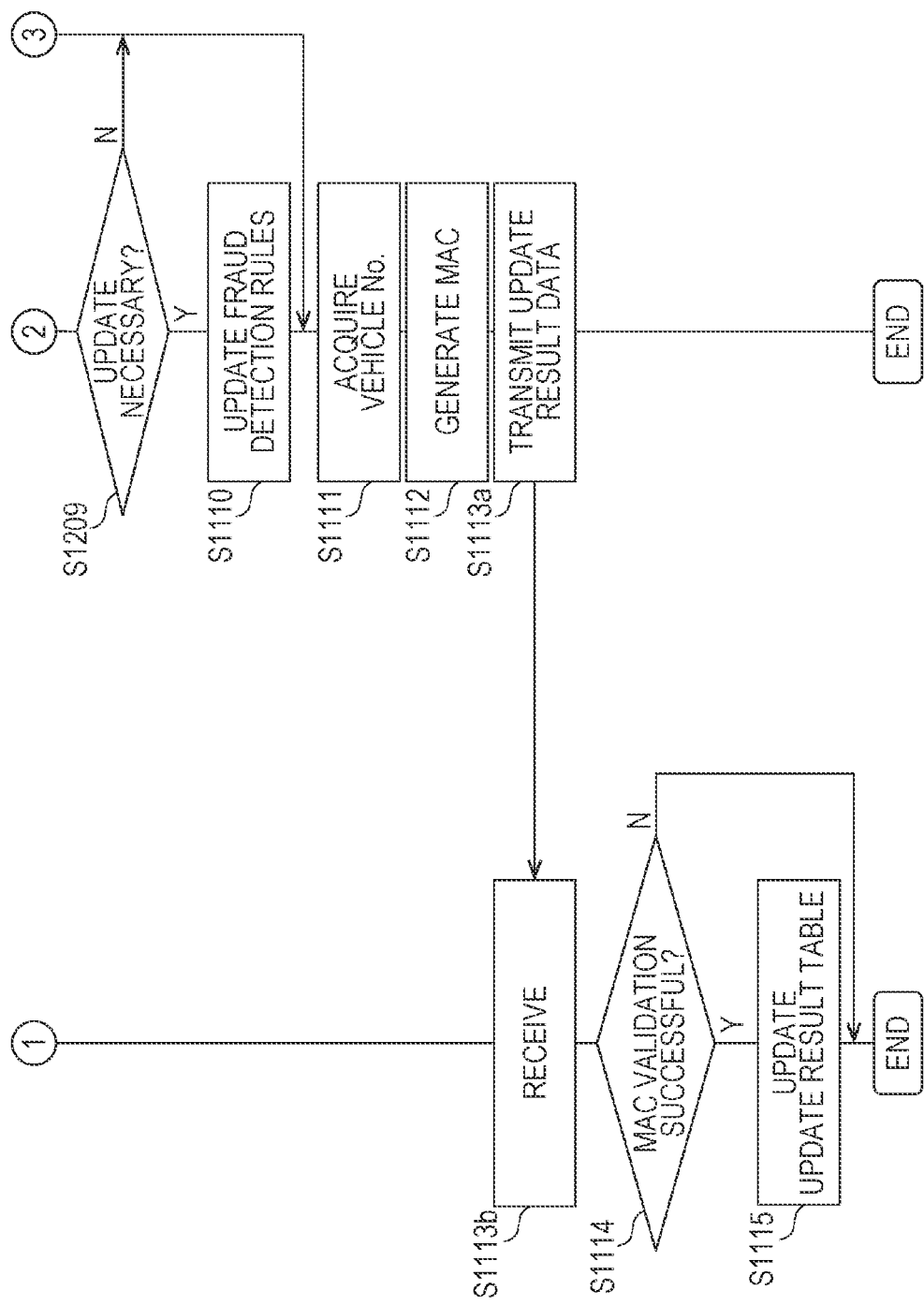
FIG. 29 is a sequence diagram illustrating example operations related to fraud detection rule updating according to a modification of Embodiment 1 (continuing from FIG. 28)

FIGS. 28 and 29 are sequence diagrams illustrating exemplary operation related to updating the fraud detection rules. The server 500 may transmit delivery data including updated fraud detection rules to each fraud detecting ECU in each on-board network system 10 of each vehicle, but herein, the description will focus on the updating of the fraud detection rules stored by the fraud detecting ECU 1400a. Additionally, steps which as the same as the steps indicated in Embodiment 1 (see FIGS. 25 and 26) are denoted with the same signs, and the description thereof will be reduced or omitted as appropriate herein.

The server 500 transmits delivery data to the fraud detecting ECU 1400a (steps S1101 to S1104a), and in the fraud detecting ECU 1400a, the external communication unit 490 informs the update determining unit 1494 of the content of the delivery data for which MAC validation was successful, namely the fraud detection rules (updated fraud detection rules) and the associated information (such as the target car model, bus type, and version information) (steps S1104b to S1106).

Next, the update determining unit 1494 of the fraud detecting ECU 1400a acquires the bus type corresponding to the bus 200a to which the fraud detecting ECU 1400a is connected from the bus type storing unit 496, acquires the car model from the vehicle no. storing unit 495, and acquires the version information corresponding to the fraud detection rules from the fraud detection rule storing unit 481 (steps S1107 and S1108). Subsequently, the update determining unit 1494 acquires the vehicle status from the vehicle status storing unit 1497 (step S1208).

Next, the update determining unit 1494 of the fraud detecting ECU 1400a determines whether or not updating the fraud detection rules according to the delivery data is necessary (step S1209). Specifically, the update determining unit 1494 makes the determination by comparing each of the bus type acquired from the bus type storing unit 496, the car model acquired from the vehicle no. storing unit 495, and the version information acquired from the fraud detection rule storing unit 481 with each of the bus type, the car model, and the version indicated by the associated information included in the delivery data, and additionally checks whether or not the vehicle status acquired from the vehicle status storing unit 1497 is a certain status (herein taken to be stopped). The update determining unit 1494 determines that updating is necessary only in the case in which the car model and the bus type match, the version of the updated fraud detection rules in the content of the delivery data is a newer version than the version of the fraud detection rules already being used by the fraud detecting ECU 1400a, and additionally, the vehicle status is stopped. Note that the certain status regarding the vehicle status that serves as a requirement for updating may also be different depending on the bus type. For example, in a fraud detecting ECU connected to a drive bus related to running, the fraud detection rules may not updated unless the vehicle is stopped, whereas in a fraud detecting ECU connected to a bus other than the drive bus, the fraud detection rules may be updated while the vehicle is moving.

If it is determined that updating is necessary in step S1209, the update determining unit 1494 of the fraud detecting ECU 1400a updates the fraud detection rules being stored by the fraud detection rule storing unit 481 to the fraud detection rules included in the delivery data (updated fraud detection rules) (step S1110).

1.30 Advantageous Effects of Modification of Embodiment 1

In the on-board network system 10 according to Modification 1 of Embodiment 1, according to factors such as the type of bus to which a fraud detecting ECU is connected, and the vehicle status of the vehicle in which the fraud detecting ECU is Installed on-board, it is determined whether or not to update fraud detection rules that serve as a basis for determining, in the fraud detection ECU, whether or not a frame transmitted on the bus is malicious. For this reason, it becomes possible to update the fraud detection rules only in the case in which the vehicle status is a certain status with high safety, for example.

Embodiment 2

Hereinafter, an on-board network system 20, which is a partial modification of the on-board network system 10 indicated in Embodiment 1, will be described.

In the on-board network system 10 according to Embodiment 1, each of the fraud detecting ECUs 400a to 400c Includes a function of acquiring information such as updated fraud detection rules by communicating with the server 500, and updating the fraud detection rules to use for inspecting malicious frames on a bus.

In contrast, in the on-board network system 20 according to the present embodiment, a type of ECU called a head unit is responsible for the function of communicating with the server 500, and each fraud detecting ECU updates its fraud detection function by acquiring information such as updated fraud detection rules through the head unit.

2.1 Overall Configuration of On-Board Network System 20

Figure 30:
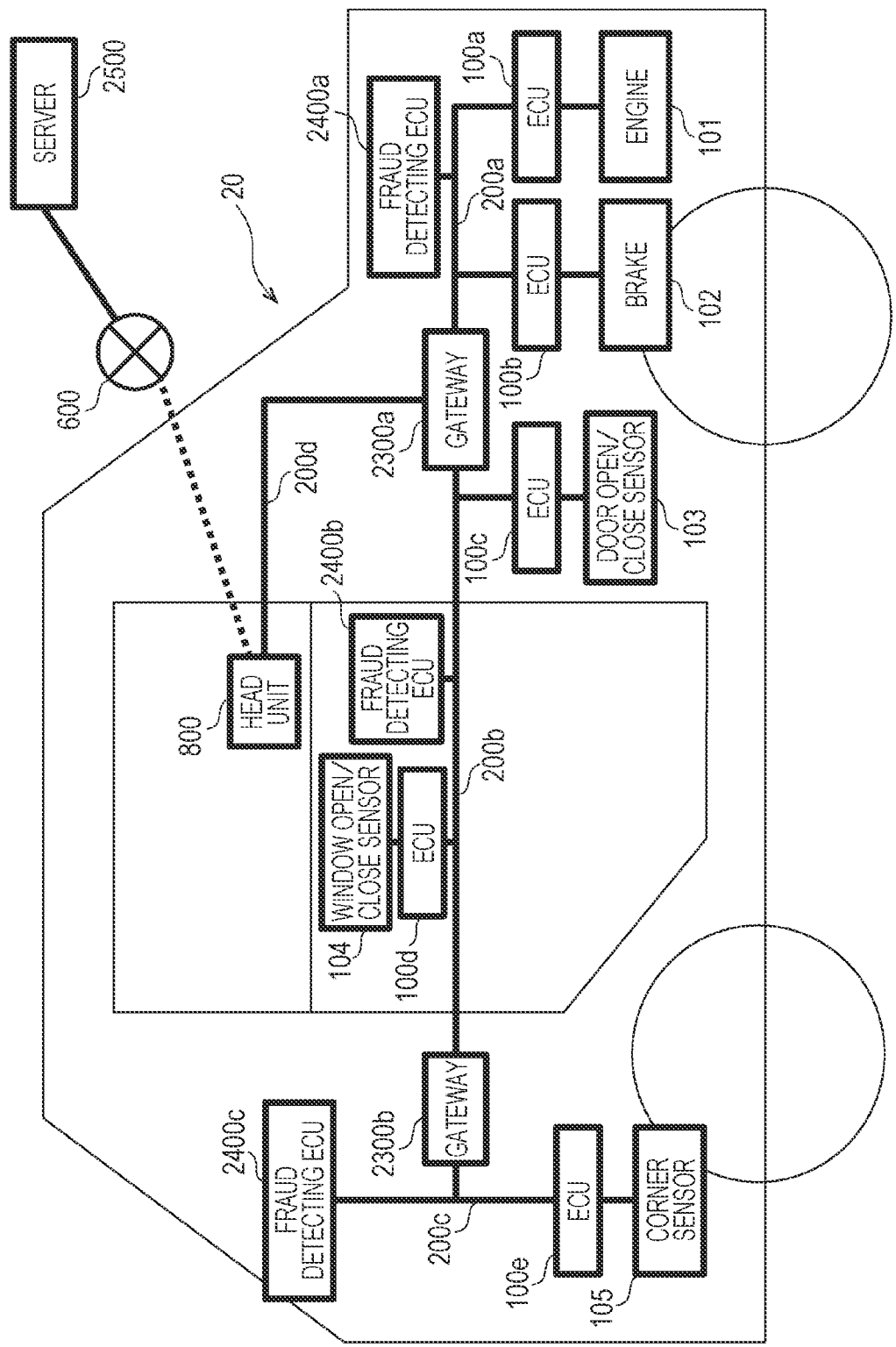
FIG. 30 is a diagram illustrating an overall configuration of an on-board network system according to Embodiment 2.

FIG. 30 is a diagram illustrating an overall configuration of the on-board network system 20. The on-board network system 20 is an example of a network communication system that communicates in accordance with the CAN protocol, and is a network communication system in an automobile having various types of equipment, such as control devices and sensors, Installed on-board. The on-board network system 20 is configured to include buses 200*a* to 200*d* and respective nodes connected to the buses, such as fraud detecting ECUs 2400*a* to 2400*c*, gateways 2300*a* and 2300*b*, a head unit 800, and ECUs such as ECUs 100*a* to 100*e* connected to various types of equipment. In addition, FIG. 30 also illustrates an external network 600 that wirelessly communicates with the head unit 800 in the on-board network system 20, and a server 2500 communicably connected to the network 600. Structural elements which are the same as the on-board network system 10 according to Embodiment 1 (see FIG. 1) are denoted with the same signs, and the description thereof will be reduced or omitted herein. Also, the on-board network system 20 is similar to the on-board network system 10 regarding points not described particularly herein.

The gateway 2300*a* connects the bus 200*a* joining the fraud detecting ECU 2400*a*, the ECU 100*a*, and the ECU 100*b*, the bus 200*b* joining the fraud detecting ECU 2400*b*, the ECU 100*c*, and the ECU 100*d*, and the bus 200*d* joining the head unit 800. The gateway 2300*b* connects the bus 200*b* joining the fraud detecting ECU 2400*b*, the ECU 100*c*, and the ECU 100*d* to the bus 200*c* joining the fraud detecting ECU 2400*c* and the ECU 100*e*. The gateways 2300*a* and 2300*b* include a function of forwarding a frame received from one bus to another bus. Whether or not to forward a received frame may also be toggled for each bus-to-bus connection. The gateways 2300*a* and 2300*b* are also a type of ECU.

The fraud detecting ECUs 2400*a* to 2400*c* area partial modification of the fraud detecting ECUs 400*a* to 400*c* Indicated in Embodiment 1, and monitors frames appearing on the bus to which the ECU itself is connected. Each of the fraud detecting ECUs 2400*a* to 2400*c* includes a function of transmitting an error frame in the case of detecting a malicious frame (see FIG. 24). Consequently, when a malicious frame is transmitted over a bus, the fraud detecting ECUs 2400*a* to 2400*c* prevent processing corresponding to the malicious frame from being conducted by other ECUs, similarly to the fraud detecting ECUs 400*a* to 400*c*.

The head unit 800 is a communication device for a vehicle, and is a type of ECU provided in a location such as on the instrument panel of an automobile, for example, and is equipped with components like with a display device such as a liquid crystal display (LCD) that displays information to be seen by the driver (user), and a means of input that accepts operations by the driver.

The server 2500 includes a function of transmitting, to the head unit 800 over the network 600, delivery data for updating the fraud detection rules that server as the basis of the fraud detection function of the fraud detecting ECUs 2400*a* to 2400*c* In the on-board network system 20. The communication between the server 2500 and the head unit 800 may use any method.

2.2 Configuration of Head Unit 800

Figure 31:
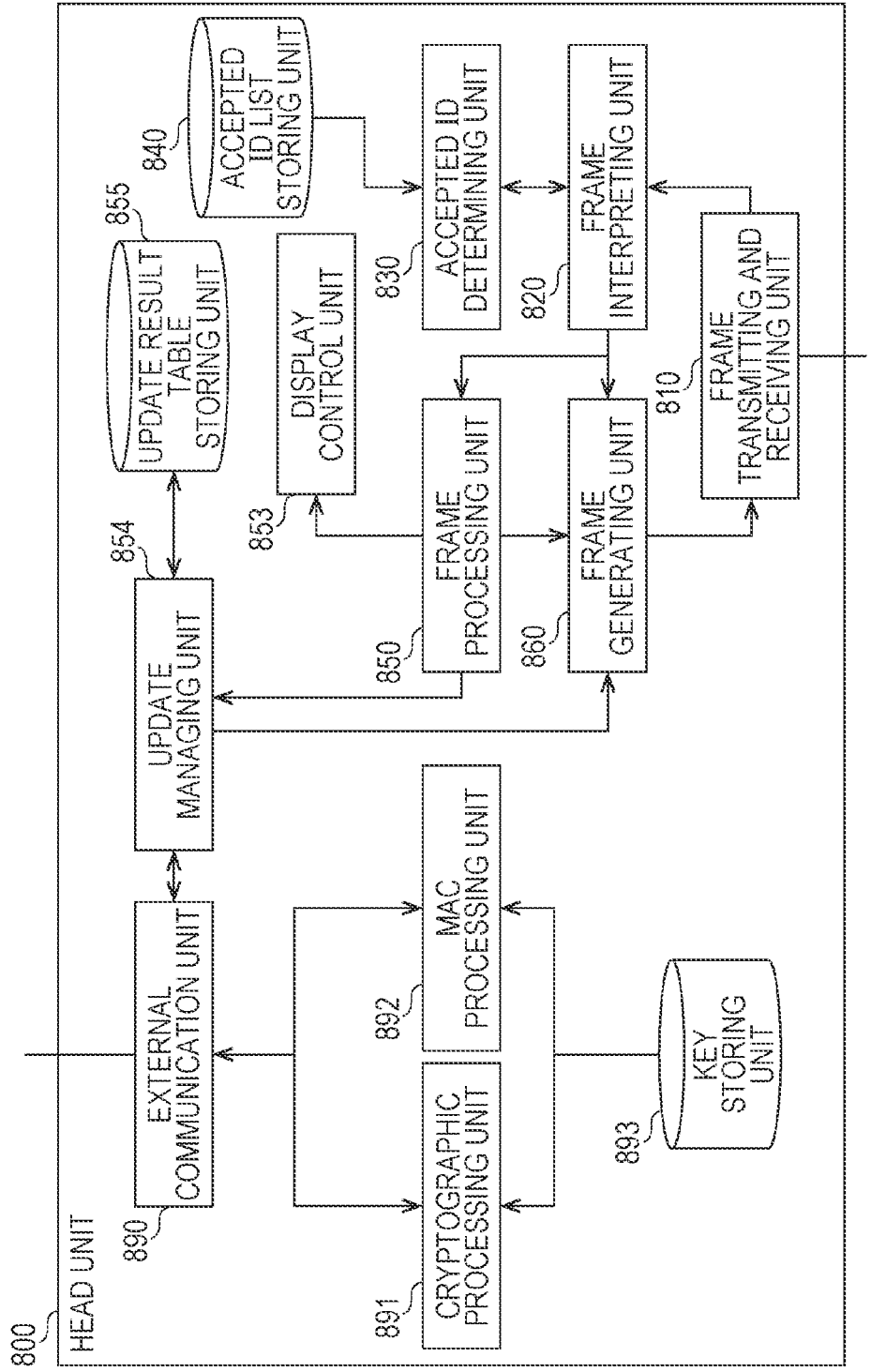
FIG. 31 is a configuration diagram of a head unit according to Embodiment 2.

FIG. 31 is a configuration diagram of the head unit 800. The head unit 800 is configured to include a frame transmitting and receiving unit 810, a frame interpreting unit 820, an accepted ID determining unit 830, an accepted ID list storing unit 840, a frame processing unit 850, a frame generating unit 860, a display control unit 853, an update managing unit 854, an update result table storing unit 855, an external communication unit 890, a cryptographic processing unit 891, a MAC processing unit 892, and a key storing unit 893. These respective structural elements are functional structural elements, and the respective functions are realized by components in the head unit 800, such as a communication circuit, a processor that executes a control program stored in memory, or a digital circuit.

The frame transmitting and receiving unit 810 transmits and receives frames in accordance with the CAN protocol to and from the bus 200*d*. In other words, the frame transmitting and receiving unit 810 receives a frame one bit at a time from the bus 200*d*, and forwards the received frame to the frame interpreting unit 820. Additionally, the frame transmitting and receiving unit 810 transmits the content of a frame reported by the frame generating unit 860 to the bus 200*d*.

The frame interpreting unit 820 receives the values of a frame from the frame transmitting and receiving unit 810, and conducts interpretation to map the values to each field in the frame format prescribed by the CAN protocol. The value determined to be the ID field is forwarded to the accepted ID determining unit 830. Also, depending on a determination result reported by the accepted ID determining unit 830, the frame interpreting unit 820 decides whether to forward the value of the ID field and the data field appearing after the ID field to the frame processing unit 850, or stop the reception of the frame after receiving the determination result (in other words, stop interpretation for that frame). In addition, in the case of determining that the frame does not adhere to the CAN protocol, the frame interpreting unit 820 notifies the frame generating unit 860 to transmit an error frame. Also, if an error frame is received, or in other words, if a received frame is interpreted to be an error frame from a value in the frame, the frame interpreting unit 820 discards the rest of the frame, or In other words, stops interpretation of the frame.

The accepted ID determining unit 830 receives the value of the ID field reported by the frame interpreting unit 820, and follows a message ID list stored by the accepted ID list storing unit 840 to determine whether or not to receive each field in the frame following the ID field. The accepted ID determining unit 830 reports the determination result to the frame interpreting unit 820.

Figure 32:
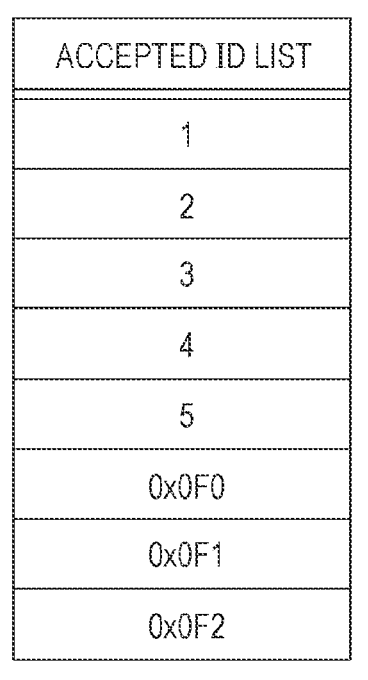

The accepted ID list storing unit 840 stores an accepted ID list, which is a list of IDs (message IDs) that the head unit 800 is to receive. FIG. 32 illustrates an example of an accepted ID list in the head unit 800.

The frame processing unit 850 converts data from received frames transmitted from respective ECUs (such as a speed obtained from the ECU 100*a* related to the engine, for example) into a displayable format, and reports to the display control unit 853. In addition, the frame processing unit 850 reports internal update result data (discussed later)

Included in frames transmitted from the fraud detecting ECUs 2400a to 2400c to the update managing unit 854.

The display control unit 853 displays data reported from the frame processing unit 850.

The frame generating unit 860 constructs an error frame in accordance with a notification of a request to transmit an error frame from the frame interpreting unit 820, and passes the error frame to the frame transmitting and receiving unit 810. In addition, the frame generating unit 860 constructs a data frame in accordance with instructions from the update managing unit 854, and passes the data frame to the frame transmitting and receiving unit 810.

The update managing unit 854 converts fraud detection rules (updated fraud detection rules) and associated information (such as bus type information and version information) Included in delivery data received from the external communication unit 890 into a format in accordance with the CAN protocol, and by passing this information to the frame generating unit 860, causes a data frame to be generated. Note that the update managing unit 854 may compare the information about the target car model in the associated information Included in the delivery data to the car model of the vehicle in which the head unit 800 is installed on-board, and discard the delivery data if the car models do not match. At this point, the data frame that the head unit 800 delivers to the fraud detecting ECUs 2400a to 2400c via the buses in the on-board network system 20 is designated internal delivery data. The internal delivery data includes updated fraud detection rules, the bus type, and version information (see FIG. 33). Herein, as the internal delivery data, the message ID "0x0E0" for updating the fraud detection rules is attached to the data frame delivered to be receivable by the fraud detecting ECU 2400a connected to the bus 200a of the "drive" bus type, the message ID "0x0E1" for updating the fraud detection rules is attached to the data frame delivered to be receivable by the fraud detecting ECU 2400b connected to the bus 200b of the "body" bus type, and the message ID "0x0E2" for updating the fraud detection rules is attached to the data frame delivered to be receivable by the fraud detecting ECU 2400c connected to the bus 200c of the "safety" bus type. Note that by having the fraud detecting ECUs 2400a to 2400c receive the data frame with the respectively corresponding message ID for updating the fraud detection rules, and acquire the internal delivery data, each of the fraud detecting ECUs 2400a to 2400c determines whether or not to update the fraud detection rules and updates as necessary. In addition, the update managing unit 854 updates an internal update result table stored by the update result table storing unit 855, based on internal update result data received from the frame processing unit 850.

The update result table storing unit 855 stores, on a device such as a storage medium, an internal update result table made up of internal update result data (see FIG. 34) from the fraud detecting ECUs 2400a to 2400c. Note that, based on the internal update result table, the update managing unit 854 may select fraud detection rules that require updating according to the version information from among each of the fraud detection rules for each type of bus included in the delivery data, and thereby cause internal delivery data related to the specific fraud detection rules to be transmitted from the head unit 800, or similarly cause the internal delivery data to be retransmitted in the case of an update failure.

The external communication unit 890 communicates with the server 2500 via the network 600, and thereby acquires delivery data including information such as updated fraud detection rules (new fraud detection rules) for updating the fraud detection rules in the fraud detecting ECUs 2400a to 2400c. The external communication unit 890 transmits acquired delivery data to the cryptographic processing unit 891, and acquires a decrypted result. Additionally, the external communication unit 890 reports a MAC that serves as validation data in the decrypted delivery data to the MAC processing unit 892, and receives a MAC validation result. The external communication unit 890 extracts updated fraud detection rules and associated information (such as the target car model, bus type information, and version information) from the decrypted delivery data, and reports the extracted information to the update managing unit 854. Delivery data delivered from the server 2500 has been subjected to an encryption process. Herein, the cryptographic process performed by the server 2500 may include encryption and the attachment of validation data, for example. Correspondingly, the cryptographic processing unit 891 and the MAC processing unit 892 execute cryptographic processes on the delivery data corresponding to the cryptographic process executed by the server 2500 (for example, decryption corresponding to the encryption, and validation corresponding to the attachment of validation data).

The cryptographic processing unit 891 uses a key acquired from the key storing unit 893 to decrypt the encrypted delivery data reported by the external communication unit 890, and reports the decrypted delivery data to the external communication unit 890.

The MAC processing unit 892 uses a key acquired from the key storing unit 893 to validate the MAC in the delivery data reported by the external communication unit 890, and reports a validation result to the external communication unit 890.

The key storing unit 893 manages keys used in the cryptographic processes by the cryptographic processing unit 891 and the MAC processing unit 892.

2.3 Example of Accepted ID List in Head Unit 800

FIG. 32 is a diagram illustrating an example of an accepted ID list stored by the accepted ID list storing unit 840 of the head unit 800. The accepted ID list illustrated as an example in FIG. 32 is used to selectively receive and process frames including a message ID whose ID (message ID) value is any of "1", "2", "3", "4", and "5", as well as "0x0F0", "0xF1", and "0x0F2". At this point, the IDs are differentiated for communication with the fraud detecting ECUs 2400a to 2400c connected to separate buses. For example, the message ID "0x0F0" is used to receive a data frame including internal update result data from the fraud detecting ECU 2400a connected to the bus 200a of the "drive" bus type. Also, the message ID "0x0F1" is used to receive a data frame including internal update result data from the fraud detecting ECU 2400b connected to the bus 200b of the "body" bus type. Also, the message ID "0x0F2" is used to receive a data frame including internal update result data from the fraud detecting ECU 2400c connected to the bus 200c of the "safety" bus type.

2.4 Internal Delivery Data Transmitted by Head Unit 800

FIG. 33 illustrates an example internal delivery data transmitted from the head unit 800 to be receivable by the fraud detecting ECU 2400a. FIG. 33 illustrates an example in which the ID of the data frame (message ID) Is set to "0x0E0", and the data field includes fraud detection rules (updated fraud detection rules) and version information. In this example, the version indicated by the version information means "2.0", and the fraud detection rules indicates a whitelist listing the four message IDs of "1", "2", "3", and "4", thereby expressing that frames including an ID other than these four IDs will be determined to be a malicious frame.

2.5 Internal Update Result Data Received by Head Unit 800

FIG. 34 illustrates an example of internal update result data reported from the fraud detecting ECU 2400a to the head unit 800. The internal update result data illustrated as an example in FIG. 34 indicates that as a result of the fraud detecting ECU connected to the drive bus receiving internal delivery data, the fraud detection rules were updated to version 2.0.

2.6 Configuration of Gateways 2300a and 2300b

The gateway 2300a includes functions that are basically similar to the gateway 300a indicated in Embodiment 1 (see FIG. 12), but is also connected to the bus 200d, and the contents of the forwarding rules stored by the forwarding rule storing unit 352 are different. The gateway 2300b Includes functions that are basically similar to the gateway 300b Indicated in Embodiment 1, but the contents of the forwarding rules stored by the forwarding rule storing unit 352 are different. The forwarding rules in the gateways 2300a and 2300b are decided so that internal delivery data transmitted from the head unit 800 is relayed to the fraud detecting ECUs that should receive the internal delivery data, and also so that internal update result data from each fraud detecting ECU is relayed to the head unit 800.

2.7 Forwarding Rules Example

FIG. 35 illustrates an example of forwarding rules stored by the gateway 2300a. These forwarding rules associate a forwarding source bus, a forwarding destination bus, and a forwarding target ID (message ID). In FIG. 35, "*" indicates that frames are forwarded regardless of the message ID. The example in FIG. 35 indicates that frames received from the bus 200a are configured to be forwarded to the bus 200b and the bus 200d, regardless of the message ID. The example in FIG. 35 also indicates that, among the frames received from the bus 200b, all frames are configured to be forwarded to the bus 200d, but only the frames having a message ID of "3" are configured to be forwarded to the bus 200a. The example in FIG. 35 also indicates that frames received from the bus 200d are configured so that a frame with a message ID of "0x0E0" (Internal delivery data) Is forwarded to the "drive" bus 200a, while a frame with a message ID of "0xE1" or "0xE2" (Internal delivery data) is forwarded to the "body" bus 200b, which also acts as a relay path to the "safety" bus 200c through the gateway 2300b.

2.8 Configuration of Fraud Detecting ECU 2400a

Figure 36:
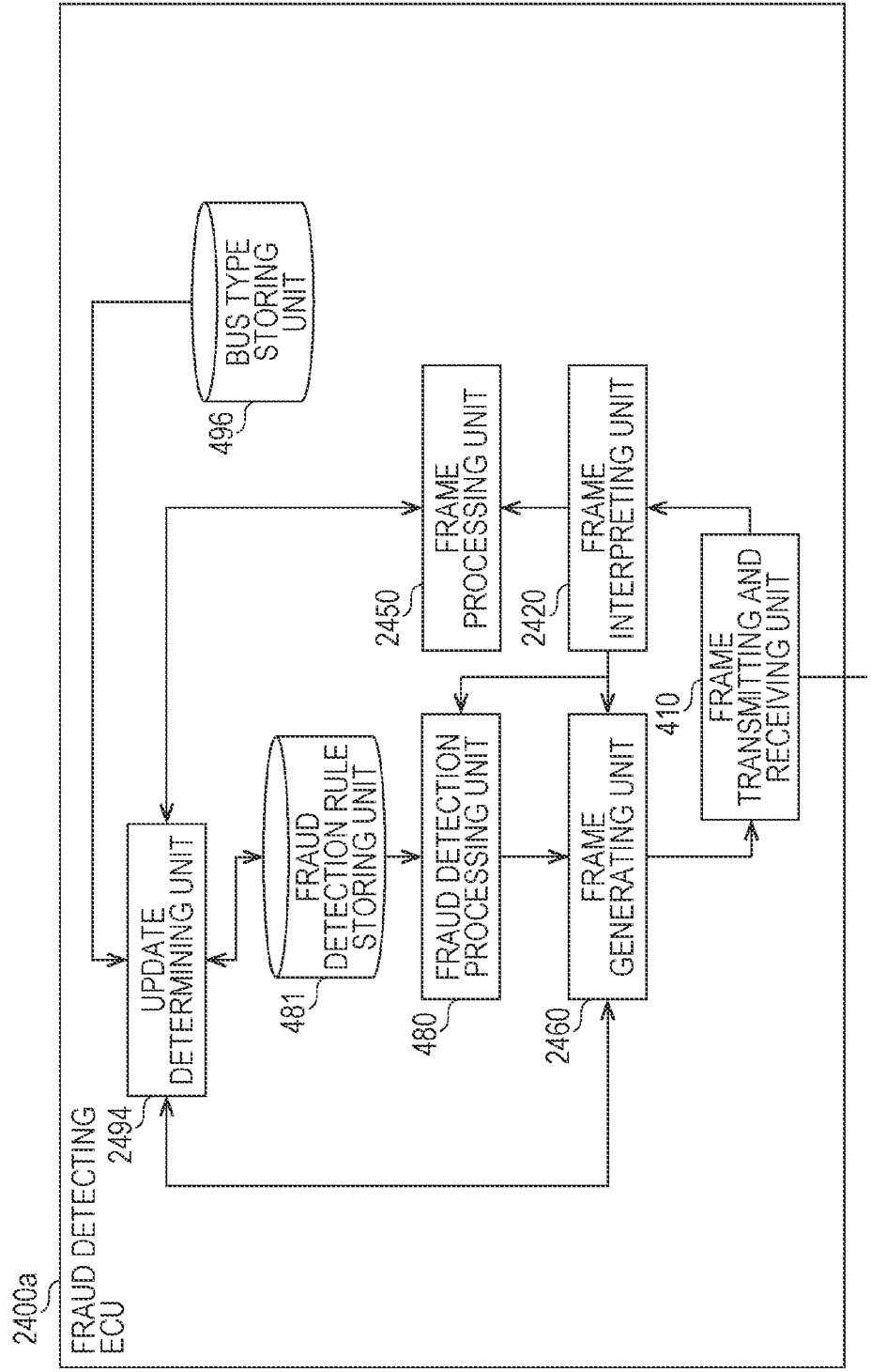
FIG. 36 is a configuration diagram of a fraud detecting ECU according to Embodiment 2.

FIG. 36 is a configuration diagram of the fraud detecting ECU 2400a. The fraud detecting ECU 2400a is configured to include a frame transmitting and receiving unit 410, a frame interpreting unit 2420, a frame processing unit 2450, a frame generating unit 2460, a fraud detection processing unit 480, a fraud detection rule storing unit 481, an update determining unit 2494, and a bus type storing unit 496.

These respective structural elements are functional structural elements, and the respective functions are realized by components in the fraud detecting ECU 2400a, such as a communication circuit, a processor that executes a control program stored in memory, or a digital circuit. Note that the fraud detecting ECU 2400b and the fraud detecting ECU 2400c likewise are equipped with basically similar configurations, but the stored contents of the fraud detection rule storing unit 481 (fraud detection rules and version information), the message IDs Included in data frames as internal update result data generated by the frame generating unit 2460, and the message IDs for distinguishing the internal delivery data reported to the frame processing unit 2450 by the frame interpreting unit 2420 from other data frames may be different from each other. Among the structural elements of the fraud detecting ECU 2400a, structural elements which are the same as the fraud detecting ECU 400a Indicated in Embodiment 1 are denoted with the same signs, and the description thereof will be reduced or omitted.

The frame interpreting unit 2420 receives the values of a frame from the frame transmitting and receiving unit 410, and conducts interpretation to map the values to each field according to the CAN protocol. The value determined to be the ID field is forwarded to the fraud detection processing unit 480. Also, regarding internal delivery data, the data content of a frame including the message ID "0x0E0" for updating fraud detection rules is reported to the frame processing unit 2450. In addition, in the case of determining that the frame does not adhere to the CAN protocol, the frame interpreting unit 2420 notifies the frame generating unit 2460 to transmit an error frame. Also, if an error frame is received, the frame interpreting unit 2420 discards the rest of the frame, or in other words, stops interpretation of the frame.

The frame generating unit 2460 constructs an error frame in accordance with a notification of instructions to transmit an error frame from the frame interpreting unit 2420 or the fraud detection processing unit 480, and passes the error frame to the frame transmitting and receiving unit 410 for transmission. In addition, if a fraud detection rules update result is reported from the update determining unit 2494, the frame generating unit 2460 constructs a data frame with a message ID of "0xF0" as internal update result data according to the update result, and passes the data frame to the frame transmitting and receiving unit 410 for transmission.

The frame processing unit 2450 extracts fraud detection rules (updated fraud detection rules) and associated information (bus type information indicating the bus type, and version information) from received internal delivery data, and reports the extracted information to the update determining unit 2494.

The fraud detection rule storing unit 481 stores a list prescribing the message IDs included in frames transmitted from the bus 200a as the fraud detection rules, and stores version information indicating the version of the fraud detection rules (see FIG. 37). Additionally, according to a notification of new fraud detection rules (updated fraud detection rules) from the update determining unit 2494, the fraud detection rule storing unit 481 updates the previously stored fraud detection rules with the updated fraud detection rules, and reports the updated result to the update determining unit 2494.

The update determining unit 2494 receives updated fraud detection rules, bus type information indicating the bus type, and version information from the frame processing unit 2450, and based on a bus type acquired from the bus type storing unit 496 and version information corresponding to the fraud detection rules stored by the fraud detection rule storing unit 481, determines whether or not updating the fraud detection rules stored by the fraud detection rule storing unit 481 is necessary. In the case of determining that updating is necessary, the update determining unit 2494 notifies the fraud detection rule storing unit 481 and updates the fraud detection rules. Additionally, the update result is reported to the frame generating unit 2460.

2.9 Example of Fraud Detection Rules in Fraud Detecting ECU 2400a

FIG. 37 is a diagram illustrating an example of fraud detection rules and version information stored by the fraud detecting ECU 2400a. The fraud detection rules (a list of legitimate message IDs) illustrated in FIG. 37 indicate that if a frame (message) transmitted on the bus 200a connected to the fraud detecting ECU 2400a does not have a message ID corresponding to any of "1", "2", "3", "0x0E0", and "0x0F0", the frame is malicious. Also, the version information Illustrated in FIG. 37 indicates that the version (Ver.) of the fraud detection rules is 1.0.

2.10 Example of Fraud Detection Rules in Fraud Detecting ECU 2400b

FIG. 38 is a diagram illustrating an example of fraud detection rules and version information stored by the fraud detecting ECU 2400b. The fraud detection rules illustrated in FIG. 38 indicate that if a frame transmitted on the bus 200b connected to the fraud detecting ECU 2400b does not have a message ID corresponding to any of "1", "2", "3", "4", "0x0E1", "0x0E2", "0x0F1", and "0x0F2", the frame is malicious. Also, the version information indicates that the version (Ver.) of the fraud detection rules is 1.0.

2.11 Example of Fraud Detection Rules in Fraud Detecting ECU 2400c

Figure 39:
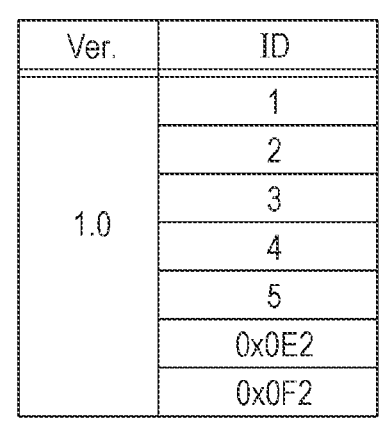

FIG. 39 is a diagram illustrating an example of fraud detection rules and version information stored by the fraud detecting ECU 2400c. The fraud detection rules illustrated in FIG. 39 indicate that if a frame transmitted on the bus 200c connected to the fraud detecting ECU 2400c does not have a message ID corresponding to any of "1", "2", "3", "4", "5", "0x0E2", and "0x0F2", the frame is malicious. Also, the version information Indicates that the version (Ver.) of the fraud detection rules is 1.0.

2.12 Configuration of Server 2500

Figure 40:
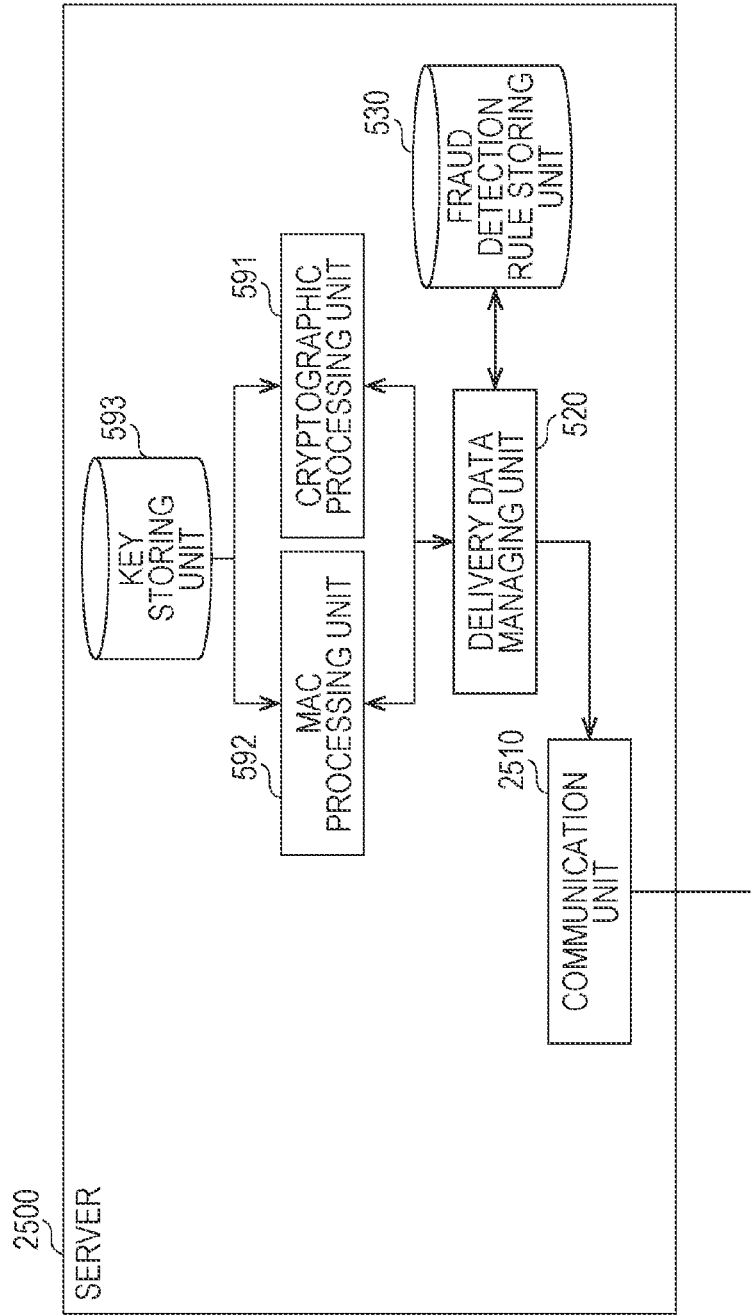
FIG. 40 is a configuration diagram of a server according to Embodiment 2.

FIG. 40 illustrates a configuration diagram of the server 2500. The server 2500 is a partial modification of the server 500 (see FIG. 22) Indicated in Embodiment 1, and is a computer existing externally to the vehicle in which the on-board network system 20 is installed on-board. The server 2500 is configured to include a communication unit 2510, a delivery data managing unit 520, a fraud detection rule storing unit 530, a cryptographic processing unit 591, a MAC processing unit 592, and a key storing unit 593. These respective structural elements are functional structural elements, and the respective functions are realized by components in the server 2500, like storage media such as a hard disk and memory, a processor that executes a control program stored in memory, and a communication circuit. Note that among the structural elements of the server 2500, structural elements which are similar to the server 500 indicated in Embodiment 1 are denoted with the same signs, and the description thereof will be reduced or omitted.

The communication unit 2510 reports delivery data (see FIGS. 18 and 19) reported from the delivery data managing unit 520 to the head unit 800 via the network 600. Note that the server 2500 may transmit delivery data including updated fraud detection rules to the head unit 800 in each on-board network system 20 of each of one or more vehicles.

2.13 Internal Update Result Table

FIG. 41 illustrates an example of an internal update result table stored by the head unit 800. In the internal update result table illustrated as an example in FIG. 41, for each bus type, the version of the last updated fraud detection rules is stated and managed.

2.14 Sequence Related to Updating Fraud Detection Rules

Figure 42:
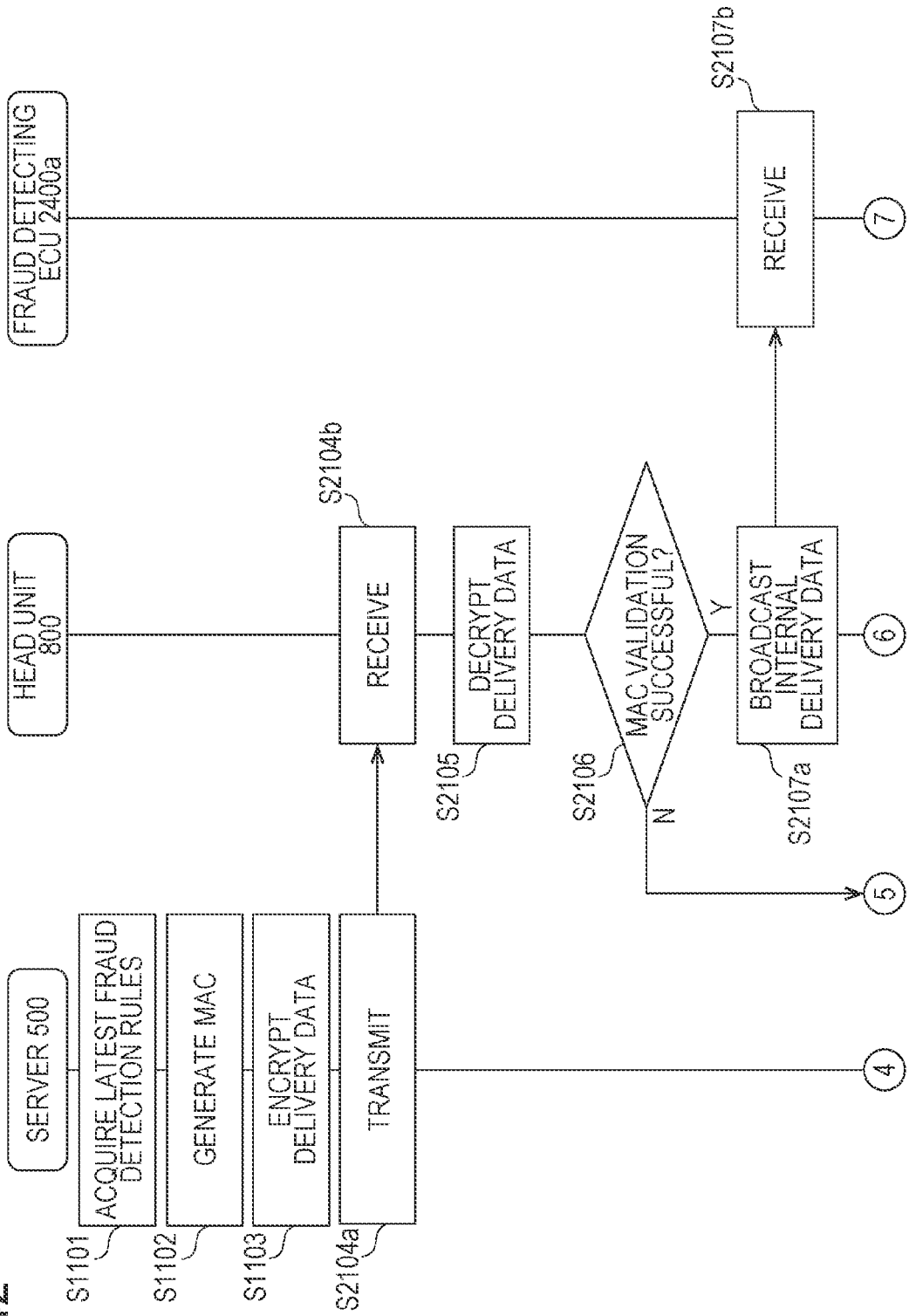
FIG. 42 is a sequence diagram illustrating example operations related to fraud detection rule updating according to Embodiment 2 (continuing to FIG. 43)
Figure 43:
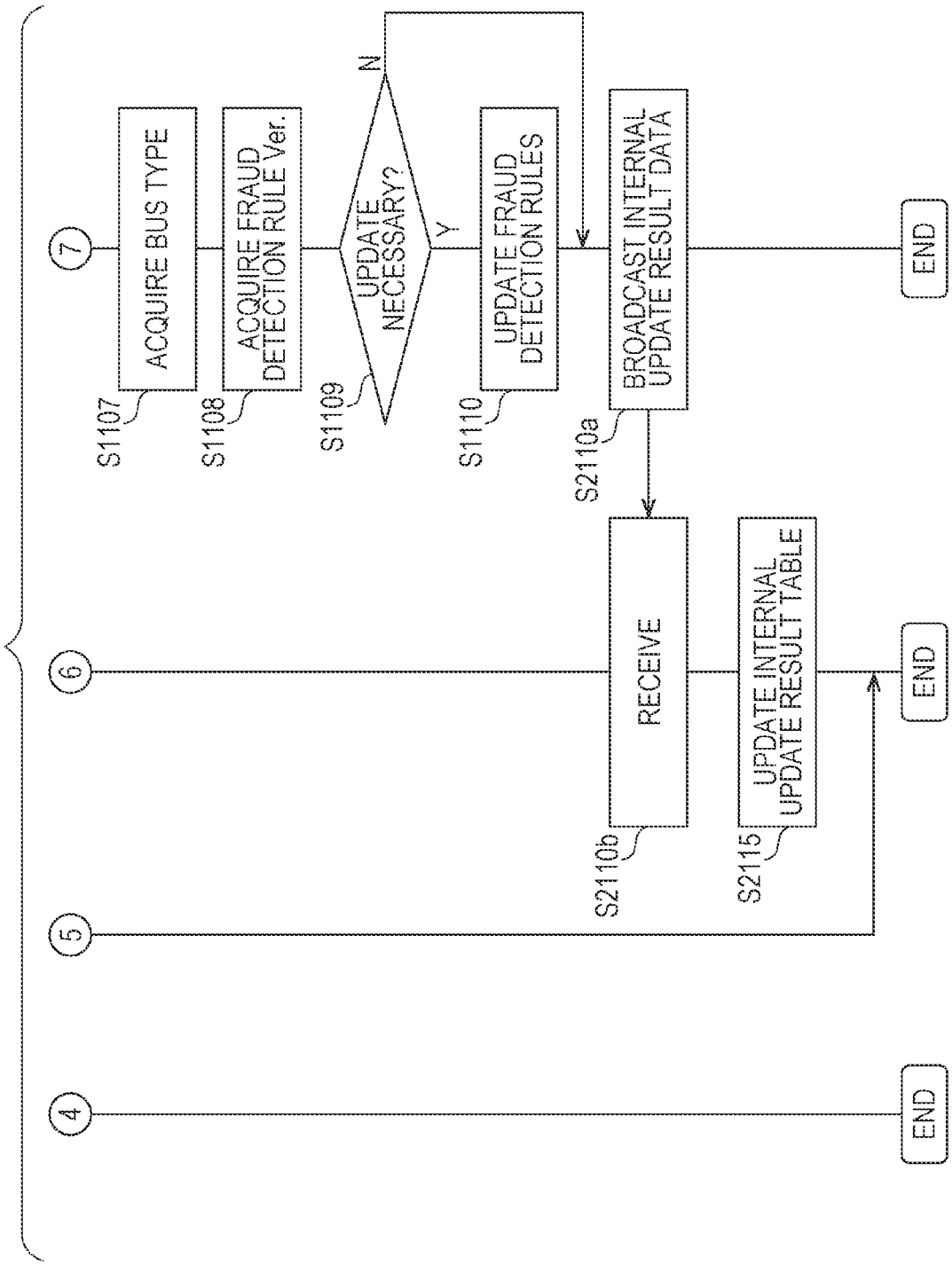
FIG. 43 is a sequence diagram illustrating example operations related to fraud detection rule updating according to Embodiment 2 (continuing from FIG. 42).

FIGS. 42 and 43 are sequence diagrams illustrating exemplary operation related to updating the fraud detection rules. Steps similar to the sequence related to updating the fraud detection rules in Embodiment 1 (see FIGS. 25 and 26) are denoted with the same signs, and the description thereof will be reduced or omitted as appropriate. Note that although the recipients of the transmission of delivery data by the server 500 according to Embodiment 1 are the fraud detecting ECUs 400a to 400c, the recipient of the transmission of delivery data by the server 2500 is the head unit 800, and in the on-board network system 20, the head unit 800 transmits internal delivery data based on the delivery data to the fraud detecting ECUs 2400a to 2400c via the buses. The description herein will focus on the head unit 800 and the fraud detecting ECU 2400a.

First, the server 2500 constructs and encrypts delivery data (steps S1101 to S1103), and transmits the delivery data to the head unit 800 (step S2104a). In response, the head unit 800 receives the delivery data (specifically, the encrypted delivery data) with the external communication unit 890 (step S2104b).

The external communication unit 890 of the head unit 800 causes the cryptographic processing unit 891 to decrypt the encrypted delivery data (step S2105).

Next, the external communication unit 890 of the head unit 800 causes the MAC processing unit 892 to validate the MAC included in the delivery data (step S2106). If the MAC validation falls, the process ends. If the MAC validation is successful, the external communication unit 890 of the head unit 800 informs the update managing unit 854 of the content of the received delivery data, namely the fraud detection rules (updated fraud detection rules) and the associated information (such as the target car model, bus type, and version information).

The update managing unit 854 of the head unit 800 converts the fraud detection rules (updated fraud detection rules) and the associated information (such as the bus type and version information) included in the delivery data to internal delivery data in a format in accordance with the CAN protocol, and thus the head unit 800 transmits (broadcasts) internal delivery data over the bus 200d (step S2107a). The internal delivery data including the updated fraud detection rules, bus type, and version information passes through the gateway 2300a and is received by the fraud detecting ECU 2400a connected to the bus 200a (step S2107b).

Next, the update determining unit 2494 of the fraud detecting ECU 2400a acquires the bus type corresponding to the bus 200a to which the fraud detecting ECU 2400a is connected from the bus type storing unit 496, and acquires the version information corresponding to the fraud detection rules from the fraud detection rule storing unit 481 (steps S1107 and S1108).

Next, the update determining unit 2494 of the fraud detecting ECU 2400a determines whether or not updating the fraud detection rules according to the internal delivery data is necessary (step S1109). Specifically, the update determining unit 2494 makes the determination by comparing each of the bus type acquired from the bus type storing unit 496 and the version information acquired from the fraud detection rule storing unit 481 with each of the bus type and the version information included in the internal delivery data. The update determining unit 2494 determines that updating is necessary only in the case in which the bus type matches and the version of the updated fraud detection rules in the content of the internal delivery data is a newer version than the version of the fraud detection rules already being used by the fraud detecting ECU 2400a.

If it is determined that updating is necessary in step S1109, the update determining unit 2494 of the fraud detecting ECU 2400a updates the fraud detection rules being stored by the fraud detection rule storing unit 481 to the fraud detection rules included in the internal delivery data (updated fraud detection rules) (step S1110).

In the case of updating in step S1110, or in the case of determining that updating is not necessary in step S1109, the update determining unit 2494 reports the update result to the frame generating unit 2460, thereby causing the fraud detecting ECU 2400a to transmit (broadcast) via the bus 200a a data frame with the message ID "0xF0" as internal update result data according to the update result (step S2110a). The internal update result data passes through the gateway 2300a and is received by the head unit 800 connected to the bus 200d (step S2110b).

Next, the head unit 800 updates the internal update result table based on the received internal update result data (step S2115).

2.15 Advantageous Effects of Embodiment 2

In the on-board network system 20 according to Embodiment 2, fraud detection rules for a fraud detecting ECU are acquired via a head unit, and whether or not to update the fraud detection rules is toggled according to the type of bus to which the fraud detecting ECU is joined. Consequently, actions such as retransmission control of fraud detection rules when updating fails becomes comparatively easy. Additionally, compared to the case of Embodiment 1, the data to be managed on the server regarding the update status of the fraud detection rules is reduced. Additionally, in the on-board network system 20, since only the one head unit 800 communicates externally and conducts cryptographic processes, the processing load on the individual fraud detecting ECUs is reduced, making it possible to configure the fraud detecting ECUs with comparatively few resources.

OTHER EMBODIMENTS

The above thus describes Embodiments 1 and 2 as illustrative examples of technology according to the present disclosure. However, the technology according to the present disclosure is not limited thereto, and is also applicable to embodiments obtained by the appropriate modification, substitution, addition, or removal of elements. For example, modifications like the following are also included as modes of the present disclosure.

(1) The above embodiments illustrate a server acting as an external device that transmits delivery data for updating the fraud detection function, but the information corresponding to the delivery data may also be transmitted from an external tool (such as a so-called diagnostic tool), which is an external device connected from a diagnostic port (an interface used to connect external tools) called On-Board Diagnostics 2 (OBD2). In addition, an external tool may also be connected to the individual fraud detecting ECUs, and information corresponding to delivery data may be input from the external tool. Also, the contents of the internal update result table in the head unit 800 illustrated in Embodiment 2 may also be made acquirable by an external tool connected to a diagnostic port. Note that the head unit 800 may also display the contents of the internal update result table according to a user operation.

(2) The above embodiments illustrate an example of determining whether or not a frame is malicious by using a whitelist listing legitimate IDs as the fraud detection rules, but fraud detection rules defined by another basis of determination may also be used for frame inspection (that is, the determination of whether or not a frame is malicious). For example, the determination may also be made by using a blacklist made up of illegitimate IDs, or a determination using the DLC, a determination using the cycle time of transmitted messages, a determination using a transmission frequency within a fixed time period, or a determination using a data field indicating appropriate data may be conducted. Whichever method of inspection (determining whether or not a frame is malicious) is used, that which expresses the rules serving as the basis of the determination are the fraud detection rules. The fraud detection rules may be data such as information in the form of rules acting as the basis for determining whether or not a frame appearing on a bus is malicious (that is, whether or not the frame conforms to the rules), a program for determining conformity to such rules (such as a program that realizes a determination algorithm), or firmware containing information and a program. includes software such as a program in an ECU and data used by the program, and may include information such as microcode in a processor of an ECU, or if the ECU includes a programmable logic controller (PLC) or a field-programmable gate array (FPGA), data used for circuit configuration in these devices, for example. Note that the fraud detection rules may be distinguished into information in the form of rules acting as the basis of determination and a program realizing an algorithm for making the determination, cryptographic processes (such as encryption and MAC attachment) using respectively separate keys may also be performed when transmitting delivery rules. Additionally, the keys used in processes corresponding to these cryptographic processes (such as decryption and MAC validation) may also be different for each bus type and fraud detecting ECU.

(3) In the above embodiments, the data frame in the CAN protocol is stated in the standard ID format, but may also adhere to the extended ID format. In the case of the extended ID format, the ID of a data frame (message ID) is expressed with a base ID at the ID position in the standard format, and an extended ID, for a total of 29 bits. Note that the on-board network system may also not necessarily conform completely to the CAN protocol.

(4) In the above embodiments, the delivery data is pushed from an external device, namely the server, but the head unit or a fraud detecting ECU may also query whether or not there is delivery data for updating the fraud detection rules. The query timing may be periodic, or at timings such as when the vehicle status changes (for example, when the engine starts, or when the ignition key is inserted into the ignition key cylinder).

(5) In the above embodiments, in the delivery data, fraud detection rules and version information are pushed from the server as a set, but it is also possible to transmit just the version information, and then send delivery data as needed. Also, the timings at which to transmit delivery data may also be transmitted by the server in consideration of the vehicle status. In this case, the server makes a determination by acquiring the vehicle status from a fraud detecting ECU or the head unit.

(6) In Embodiment 2 above, the delivery of internal delivery data from the head unit to a fraud detecting ECU is conducted via a bus in accordance with the CAN protocol, but internal delivery data may also be delivered by some other method. For example, a dedicated communication line linking the head unit and a fraud detecting ECU may also be used.

(7) If the fraud detecting ECU illustrated in the modification of Embodiment 1 above determines in step S1209 that updating of the fraud detection rules should not be conducted due to the vehicle status not being a certain status, the fraud detecting ECU may also hold temporarily the updated fraud detection rules included in the acquired delivery data, wait until the vehicle status is changed to a certain status, and update the fraud detection rules being stored in the fraud detection rule storing unit 481 (update to the updated fraud detection rules). In addition, the fraud detecting ECU may also wait until the vehicle status is changed to a certain status, request retransmission of the delivery data from the server (external device), newly receive delivery data, and update the fraud detection rules to the updated fraud detection rules included in the newly received delivery data.

(8) The MAC attached to the delivery data illustrated in the above embodiments may be a shared key, or a signature verifiable with a public key. blic key. Also, in Embodiment 2, cryptographic processes (encryption, MAC generation, MAC validation) are conducted only by the server and the head unit, but keys may also be shared in advance and cryptographic processes may also be performed on the communicated content for communication between the head unit and the fraud detecting ECUs. Note that the keys used for encryption and decryption and the keys used for MAC generation and validation may be the same keys or different keys.

(9) In Embodiment 2 above, the fraud detecting ECU receives information such as the fraud detection rules via the head unit connected to the outside, but the head unit is merely one example, and the fraud detecting ECU may also receive information via another ECU connected to the outside. The ECU connected to the outside may be a device such as a central gateway that connects to a communication bus by multiple protocols, or a gateway that controls a diagnostic port, for example.

(10) In the above embodiments, "drive", "body", and "safety" are given as examples of the types of buses to which the fraud detecting ECUs are connected, but the types of buses may be categorized according to any organizational scheme, and there may be any number of such categories.

(11) In the above embodiments, an example is given in which the determination of whether or not updating the fraud detection rules is necessary is conducted according to factors such as the car model, bus type, version information, and vehicle status. However, for the certain update conditions that act as the conditions of the determination, only some of the conditions given as an example (such as the car model, bus type, version information, and vehicle status) may be used, or conditions other than those given as an example may be added. The certain update conditions may be only conditions related to the associated information (such as the car model, bus type, and version information) determined in correspondence with the fraud detection rules, or may also include conditions related to factors independent from the associated information, such as the vehicle status. Additionally, the determination of whether or not such certain update conditions are satisfied may be conducted by any of a fraud detecting ECU or some other ECU (such as a head unit), or may be conducted by both in a distributed manner. It is sufficient for the configuration to update the fraud detection rules used for malicious frame determination by a fraud detecting ECU to new fraud detection rules (updated fraud detection rules) If the certain update conditions are satisfied. For example, in the case in which the certain update conditions are only conditions related to the associated information, a fraud detecting ECU updates the fraud detection rules if the associated information in the delivery data or the internal delivery data received by the fraud detecting ECU satisfies the certain update conditions, and does not update if the associated information does not satisfy the certain update conditions. Also, in the case of including the car model as associated information, if the car model of the associated information indicates the car model of the vehicle in which the on-board network system is installed on-board, the certain update conditions may be considered satisfied for that on-board network system, and the updating of the fraud detection rules may be performed.

(12) The fraud detecting ECUs and other ECUs in the above embodiments are taken to be devices including components like digital circuits, such as a processor and memory, analog circuits, and communication circuits, but may also include other hardware structural elements, such as a hard disk device, a display, a keyboard, and a mouse. Additionally, instead of realizing functions in software by having a processor execute a control program stored in memory, such functions may also be realized by special-purpose hardware (such as digital circuits).

(13) Some or all of the structural elements constituting each device in the above embodiments may also be configured as a single system large-scale integration (LSI) chip. A system LSI chip is a multi-function LSI chip fabricated by integrating multiple components onto a single chip, and specifically is a computer system including a microprocessor, ROM, RAM, and the like. A computer program is recorded in the RAM. The system LSI chip achieves the functions thereof as a result of the microprocessor operating in accordance with the computer program. In addition, the respective units of the structural elements constituting each of the above devices may be realized individually as separate chips, or as a single chip that includes some or all structural elements. Also, although system LSI is discussed herein, the circuit integration methodology may also be referred to as IC, LSI, super LSI, or ultra LSI, depending on the degree of integration. Furthermore, the circuit integration methodology is not limited to LSI, and may be also be realized with special-purpose circuits or general-purpose processors. An FPGA capable of being programmed after LSI fabrication, or a reconfigurable processor whose internal LSI circuit cell connections and settings may be reconfigured, may also be used. Furthermore, if circuit integration technology that may be substituted for LSI appears as a result of progress in semiconductor technology or another derived technology, obviously the new technology may be used to integrate the function blocks. Biotechnology applications and the like are also a possibility.

(14) Some or all of the structural elements constituting each of the above devices may also be configured as an IC card or a separate module that may be inserted into each device. The IC card or the module is a computer system made up of components such as a microprocessor, ROM, and RAM. The IC card or the module may also include the advanced multi-function LSI chip discussed above. The IC card or the module achieves the functions thereof as a result of the microprocessor operating in accordance with the computer program. The IC card or the module may also be tamper-resistant.

(15) One aspect of the present disclosure may be taken to be a fraud detection rule updating method illustrated in drawings such as FIGS. 25, 26, 28, 29, 42, and 43, for example. In addition, these methods may betaken to be a computer program realized by a computer, or a digital signal containing a computer program. In addition, one aspect of the present disclosure may be realized by recording the computer program or the digital signal onto a computer-readable recording medium, such as a flexible disk, hard disk, CD-ROM, MO, DVD, DVD-ROM, DVD-RAM, Blu-ray (registered trademark) Disc (BD), or semiconductor memory, for example. In addition, one aspect of the present disclosure may also be taken to be the digital signal recorded on these recording media. In addition, one aspect of the present disclosure may also be realized by transmitting the computer program or the digital signal over an electrical communication link, a wired or wireless communication link, a network such as the Internet, or a data broadcast. In addition, one aspect of the present disclosure may also be a computer system equipped with a microprocessor and memory, in which the memory records the above computer program, and the microprocessor operates according to the computer program. In addition, one aspect of the present disclosure may also be carried out by another independent computer system by recording and transporting the program or the digital signal on a recording medium, or transporting the program or the digital signal over a medium such as a network.

(16) Embodiments realized by arbitrarily combining the respective structural elements and functions indicated in the above embodiments and the above modifications are also included in the scope of the present disclosure.

An aspect of the present disclosure is usable for updating rules that serve as a basis for detecting the transmission of malicious frames on a bus in an on-board network.

What is claimed is:

1. A method used in an on-board network system provided with a plurality of electronic controllers that exchange messages by communication over one or more networks, and a fraud detecting electronic controller connected to the one or more networks, the method comprising:
   determining, in the fraud detecting electronic controller, whether or not a message transmitted on the one or more networks connected to the fraud detecting electronic controller conforms to the rules based on fraud detection rules;
   querying an external device whether or not there is delivery data for updating the fraud detection rules;
   when there is the delivery data for updating the fraud detection rules, receiving, from an external device external to the on-board network system, the delivery data including updated fraud detection rules and network type information indicating one of a plurality of network types to which the updated fraud detection rules are to be applied;
   determining whether or not a vehicle in which the on-board network system is installed is running;
   when the vehicle is determined to be running, additionally determining whether or not the network type information indicates a drive network that is connected to an electronic controller related to travel of the vehicle;
   (i) when the network type information indicates the drive network, not conducting an update process with the updated fraud detection rules; and
   (ii) when the network type information does not indicate the drive network, updating the fraud detection rules to the updated fraud detection rules.

2. The method according to claim 1,
wherein when the network type connected to the fraud detecting electronic controller is indicated by the network type information, the fraud detecting electronic controller treats a certain update condition as satisfied, and performs the update.

3. The method according to claim 1,
wherein the delivery data includes a plurality of updated fraud detection rules and network type information indicating a network type corresponding to each of the plurality of updated fraud detection rules, and
the fraud detecting electronic controller conducts the receiving of the delivery data by communicating with the external device, extracts from the delivery data updated fraud detection rules corresponding to network type information matching the network type connected to the fraud detecting electronic controller, and updates the fraud detection rules associated with the determination to the extracted updated fraud detection rules.

4. The method according to claim 1,
wherein the delivery data includes a plurality of updated fraud detection rules and network type information indicating network type corresponding to each of the plurality of updated fraud detection rules,
one of the electronic controllers conducts the receiving of the delivery data, includes each of the updated fraud detection rules from the delivery data in a message with an attached message ID for updating fraud detection rules according to the network type indicated by the corresponding network type information, and transmits the message over the one or more networks, and
the fraud detecting electronic controller receives, from the one or more networks, the message with the message ID for updating fraud detection rules according to the network type connected to the fraud detecting electronic controller, and updates the fraud detection rules associated with the determination to the updated fraud detection rules included in the message.

5. The method according to claim 1,
wherein the delivery data includes associated information, a certain update condition is a condition related to the associated information, and
the updating of the fraud detection rules is conducted when the associated information in the received delivery data satisfies the certain update condition, and is not conducted when the associated information does not satisfy the certain update condition.

6. The method according to claim 5,
wherein whether or not the certain update condition is satisfied is determined according to a result of comparing the associated information to information stored by the electronic controller or the fraud detecting electronic controller.

7. The method according to claim 6,
wherein the associated information indicates a version of the updated fraud detection rules, and
when the associated information indicates a version newer than the version of the fraud detection rules serving as a basis of the determination, the fraud detecting electronic controller treats the certain update condition as satisfied, and conducts the update.

8. The method according to claim 5,
wherein the associated information indicates a vehicle type to which the updated fraud detection rules are to be applied, and
when the associated information indicates a vehicle type corresponding to a vehicle in which the on-board network system is installed, the certain update condition is treated as satisfied, and the update is conducted.

9. The method according to claim 1,
wherein the fraud detection rules and the updated fraud detection rules are configured to include a program for determining conformity to the rules.

10. The method according to claim 1,
wherein the delivery data has been subjected to a cryptographic process, and
during the receiving of the delivery data, a process corresponding to the cryptographic process is performed.

11. The method according to claim 1,
wherein the plurality of electronic controllers communicate over the one or more networks in accordance with a controller area network (CAN) protocol.

12. The method according to claim 1,
wherein the plurality of network types includes
(i) the drive network connected to an electronic controller related to a travel of the vehicle, the travel of the vehicle including an engine, fuel and a transmission,
(ii) a body network connected to an electronic controller related to a control of one of equipment of the vehicle, the equipment including a door lock, an air conditioner, a light and a winker, and
(iii) a safety network connected to an electronic controller related to safety, the safety including a brake and an air bag.

13. A fraud detecting electronic controller connected to one or more networks used for communication by a plurality of electronic controllers, comprising:
a processor, and
a memory having a computer program stored thereon, the computer program causing the processor to execute operations, including
storing fraud detection rules;
determining whether or not a message transmitted on the network connected to the fraud detecting electronic controller conforms to the rules based on the fraud detection rules;
querying an external device whether or not there is delivery data for updating the fraud detection rules;
when there is the delivery data for updating the fraud detection rules, receiving the delivery data including updated fraud detection rules and network type information indicating one of a plurality of network types to which the updated fraud detection rules are to be applied;
determining whether or not a vehicle in which an on-board network system is installed is running, the on-board network system including the plurality of controllers;
when the vehicle is determined to be running, additionally determining whether or not the network type information indicates a drive network that is connected to an electronic controller related to a travel of the vehicle;
(i) when the network type information indicates the drive network, not conducting an update process with the updated fraud detection rules; and
(ii) when the network type information does not indicate the drive network, updating the fraud detection rules to the updated fraud detection rules.

14. The controller according to claim 13,
wherein when the network type connected to the fraud detecting electronic controller is indicated by the network type information, the fraud detecting electronic controller treats a certain update condition as satisfied, and performs the update.

15. The controller according to claim 13,
wherein the delivery data includes a plurality of updated fraud detection rules, and includes network type information indicating a network type corresponding to each of the plurality of updated fraud detection rules, and
the fraud detecting electronic controller conducts the receiving of the delivery data by communicating with the external device, extracts from the delivery data updated fraud detection rules corresponding to network type information matching the network type connected to the fraud detecting electronic controller, and updates the fraud detection rules associated with the determination to the extracted updated fraud detection rules.

16. The controller according to claim 13,
wherein the delivery data includes a plurality of updated fraud detection rules, and includes network type information indicating a network type corresponding to each of the plurality of updated fraud detection rules,
one of the electronic controllers conducts the receiving of the delivery data, includes each of the updated fraud detection rules from the delivery data in a message with an attached message ID for updating fraud detection rules according to the network type indicated by the corresponding network type information, and transmits the message over the one or more networks, and
the fraud detecting electronic controller receives, from the one or more networks, the message with the message ID for updating fraud detection rules according to the network type connected to the fraud detecting electronic controller, and updates the fraud detection rules associated with the determination to the updated fraud detection rules included in the message.

17. An on-board network system, comprising:
a plurality of electronic controllers configured to exchange messages by communication over one or more networks; and
a fraud detecting electronic controller configured to connect to the one or more networks,
wherein the fraud detecting electronic controller determines whether or not a message transmitted on the one or more networks connected to the fraud detecting electronic controller conforms to the rules based on fraud detection rules,
one of the electronic controllers queries an external device whether or not there is delivery data for updating the fraud detection rules, receives, from an external device external to the on-board network system, the delivery data including updated fraud detection rules and network type information indicating one of a plurality of network types to which the updated fraud detection rules are to be applied when there is the delivery data for updating the fraud detection rules, and transmits the updated fraud detection rules over the one or more networks, and the fraud detecting electronic controller
- receives the updated fraud detection rules from the one or more networks,
- determines whether or not a vehicle in which the on-board network system is installed is running,
- when the vehicle is determined to be running, additionally determines whether or not the network type information indicates a drive network that is connected to an electronic controller related to the travel of the vehicle,
  - (i) when the network type information indicates a drive network related to running, does not conduct an update process with the updated fraud detection rules, and
  - (ii) when the network type information does not indicate a drive network related to running, updates the fraud detection rules to the updated fraud detection rules.

18. The system according to claim 17,
wherein when the network type connected to the fraud detecting electronic controller is indicated by the network type information, the fraud detecting electronic controller treats a certain update condition as satisfied, and performs the update.

19. The system according to claim 17,
wherein the delivery data includes a plurality of updated fraud detection rules, and includes network type information indicating a network type corresponding to each of the plurality of updated fraud detection rules, and
the fraud detecting electronic controller conducts the receiving of the delivery data by communicating with the external device, extracts from the delivery data updated fraud detection rules corresponding to network type information matching the network type connected to the fraud detecting electronic controller, and updates the fraud detection rules associated with the determination to the extracted updated fraud detection rules.

20. The system according to claim 17,
wherein the delivery data includes a plurality of updated fraud detection rules, and includes network type information indicating a network type corresponding to each of the plurality of updated fraud detection rules,
one of the electronic controllers conducts the receiving of the delivery data, includes each of the updated fraud detection rules from the delivery data in a message with an attached message ID for updating fraud detection rules according to the network type indicated by the corresponding network type information, and transmits the message over the one or more networks, and
the fraud detecting electronic controller receives, from the one or more networks, the message with the message ID for updating fraud detection rules according to the network type connected to the fraud detecting electronic controller, and updates the fraud detection rules associated with the determination to the updated fraud detection rules included in the message.

* * * * *